US012684466B2

(12) United States Patent
Sugawara et al.

(10) Patent No.: US 12,684,466 B2
(45) Date of Patent: Jul. 14, 2026

(54) USER EQUIPMENT (UE)

(71) Applicant: SHARP KABUSHIKI KAISHA, Sakai City (JP)

(72) Inventors: Yasuo Sugawara, Sakai City (JP); Masafumi Aramoto, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 468 days.

(21) Appl. No.: 17/914,331

(22) PCT Filed: Mar. 26, 2021

(86) PCT No.: PCT/JP2021/012943
§ 371 (c)(1),
(2) Date: Sep. 24, 2022

(87) PCT Pub. No.: WO2021/193937
PCT Pub. Date: Sep. 30, 2021

(65) Prior Publication Data
US 2023/0115813 A1 Apr. 13, 2023

(30) Foreign Application Priority Data
Mar. 27, 2020 (JP) ................................ 2020-057430

(51) Int. Cl.
| *H04W 48/18* | (2009.01) |
| *H04W 48/14* | (2009.01) |
| *H04W 60/00* | (2009.01) |

(52) U.S. Cl.
CPC ........... *H04W 48/14* (2013.01); *H04W 48/18* (2013.01); *H04W 60/00* (2013.01)

(58) Field of Classification Search
CPC ..... H04W 48/14; H04W 48/18; H04W 60/00; H04W 60/04; H04W 48/16
See application file for complete search history.

(56) References Cited

U.S. PATENT DOCUMENTS

2018/0367980 A1* 12/2018 Lee ................... H04W 36/0011
2023/0052699 A1* 2/2023 Ninglekhu ............ H04W 60/04
(Continued)

OTHER PUBLICATIONS

3GPP TS 23.501 V16.3.0 (Dec. 2019) 3rd Generation Partnership Project; Technical Specification Group Services and System Aspects; System architecture for the 5G System (5GS); Stage 2(Release 16).
(Continued)

*Primary Examiner* — Marcus Hammonds
(74) *Attorney, Agent, or Firm* — ScienBiziP, P.C.

(57) ABSTRACT

A UE receives, from a first base station apparatus, system information and/or a registration accept message including a first frequency band supported by the first base station apparatus, first S-NSSAI corresponding to a first frequency band, a second frequency band supported by a second base station apparatus, and second S-NSSAI corresponding to a second frequency band. The UE recognizes that a registration request message and/or a PDU session establishment request message including the second S-NSSAI is not transmittable via the first base station apparatus, and in a case of reselecting a cell of the second base station apparatus, recognizes that the registration request message and/or the PDU session establishment request message including the first S-NSSAI is not transmittable via the second base station apparatus. This prevents, in a 5GS, transmission of a registration request message and/or PDU session establishment request message which is unnecessary.

2 Claims, 8 Drawing Sheets

(56) References Cited

U.S. PATENT DOCUMENTS

2023/0108950 A1* 4/2023 Centonza ............. H04W 36/14
370/331
2023/0156583 A1* 5/2023 Murray ................ H04W 48/20
370/329

OTHER PUBLICATIONS

3GPP TS 23.502 V16.3.0 (Dec. 2019) 3rd Generation Partnership Project; Technical Specification Group Services and System Aspects; Procedures for the 5G System (5GS); Stage 2(Release 16).

3GPP TS 24.501 V16.3.0 (Dec. 2019) 3rd Generation Partnership Project; Technical Specification Group Core Network and Terminals; Non-Access-Stratum (NAS) protocol for 5G System(5GS); Stage 3 (Release 16).

3GPP TR 23.700-40 V0.3.0 (Jan. 2020) 3rd Generation Partnership Project; Technical Specification Group Services and System Aspects; Study on enhancement of network slicing; Phase 2(Release 17).

Samsung, "Key Issue on 5GC assisted cell selection to access network slice", S2-2001467, SA WG2 Meeting #136 Ad-hoc, Jan. 13-17, 2020, Incheon, Korea.

Sharp, "Considerations on Frequency Band Selection for RAN Slicing", R2-2007606, 3GPP TSG RAN WG2 Meeting #111e, Aug. 17-28, 2020.

* cited by examiner

USER EQUIPMENT (UE)

TECHNICAL FIELD

This application relates to a User Equipment (UE). This application claims the benefit of priority to JP 2020-57430 filed on Mar. 27, 2020, which is incorporated herein by reference in its entirety.

BACKGROUND ART

In the 3rd Generation Partnership Project (3GPP), the system architecture of a 5G System (5GS) corresponding to a fifth generation (5G) mobile communication system has been under study, and the support of new procedures and new functions has been discussed (see NPLs 1 to 3). In Release 15 being the initial release of the 5G standard, the concept of "network slice" is introduced, and in Release 17, enhancement of a function of the network slice is discussed (see NPLs 4 and 5).

CITATION LIST

Non Patent Literature

NPL 1: 3GPP TS 23.501 V16.3.0 (2019-12); 3rd Generation Partnership Project; Technical Specification Group Services and System Aspects; System Architecture for the 5G System; Stage 2 (Release 16)

NPL 2: 3GPP TS 23.502 V16.3.0 (2019-12); 3rd Generation Partnership Project: Technical Specification Group Services and System Aspects; Procedures for the 5G System: Stage 2 (Release 16)

NPL 3: 3GPP TS 24.501 V16.3.0 (2019-12); 3rd Generation Partnership Project; Technical Specification Group Core Network and Terminals; Non-Access-Stratum (NAS) protocol for 5G System (5GS); Stage 3 (Release 16)

NPL 4: 3GPP TR 23.700-40 V0.3.0 (2020-01); 3rd Generation Partnership Project; Technical Specification Group Services and System Aspects; Study on Enhancement of Network Slicing Phase 2 (Release 17)

NPL 5: SA WG2 Meeting #136 Ad-hoc; S2-2001467; 13-17 Jan. 2020, Incheon, Korea

SUMMARY OF INVENTION

Technical Problem

In the discussions of NPLs 4 and 5, a configuration that a User Equipment (UE) selects an access network by utilizing Single Network Slice Selection Assistance Information (S-NSSAI) has been under study. However, specific solutions have not yet been disclosed. There is a problem in that the UE transmits a registration request message and/or PDU session establishment request message which is unnecessary via an access network not supporting the S-NSSAI. In a case that the UE transmits a registration request message and/or a PDU session establishment request message via an access network not supporting the S-NSSAI, what sort of behaviors are performed by the UE and a network apparatus has not been disclosed.

The present invention is made in view of the circumstances as described above, and is to provide a method of preventing a UE from transmitting a registration request message and/or PDU session establishment request message which is unnecessary via an access network not supporting S-NSSAI, and to clarify behaviors of the UE and a network apparatus in a case that the UE transmits a registration request message and/or a PDU session establishment request message via an access network not supporting the S-NSSAI.

Solution to Problem

A UE according to an embodiment of the present invention is a User Equipment (UE) including a transmission and/or reception unit and a controller, wherein the transmission and/or reception unit receives, from a first base station apparatus, system information and/or a registration accept message including a first frequency band supported by the first base station apparatus, first Single Network Slice Selection Assistance Information (S-NSSAI) corresponding to the first frequency band, a second frequency band supported by a second base station apparatus, and second S-NSSAI corresponding to the second frequency band, and the controller recognizes that a registration request message and/or a PDU session establishment request message including the first S-NSSAI is transmittable via the first base station apparatus, a registration request message and/or a PDU session establishment request message including the second S-NSSAI is not transmittable via the first base station apparatus, and in a case of reselecting a cell of the second base station apparatus, a registration request message and/or a PDU session establishment request message including the first S-NSSAI is not transmittable via the second base station apparatus, and a registration request message and/or a PDU session establishment request message including the second S-NSSAI is transmittable via the second base station apparatus.

A UE according to an embodiment of the present invention is a User Equipment (UE) including a transmission and/or reception unit and a controller, wherein the transmission and/or reception unit transmits, to an Access and Mobility Management Function (AMF) via a first base station apparatus, a registration request message including requested Network Slice Selection Assistance Information (NSSAI) including second S-NSSAI corresponding to a second frequency band supported by a second base station apparatus, and receives a registration accept message or a registration reject message transmitted from the AMF via the first base station apparatus, the registration accept message or the registration reject message including rejected NSSAI including the second S-NSSAI, a second frequency band corresponding to the second S-NSSAI, and a cause value indicating that a network does not support the second S-NSSAI or the second frequency band, and the controller recognizes that a registration request message and/or a PDU session establishment request message including the second S-NSSAI is not transmittable via the first base station apparatus, based on the cause value.

Advantageous Effects of Invention

According to an aspect of the present invention, a method of preventing a UE from transmitting a registration request message and/or PDU session establishment request message which is unnecessary via an access network not supporting S-NSSAI can be provided, and behaviors of the UE and a network apparatus in a case that the UE transmits a registration request message and/or PDU session establishment request message which is unnecessary via an access network not supporting the S-NSSAI can be clarified.

DESCRIPTION OF EMBODIMENTS

A preferred embodiment for carrying out the present invention will be described below with reference to the drawings. Note that, as an example, an embodiment of a mobile communication system to which the present invention is applied will be described in the present embodiment.

1. Overview of System

Figure 1:
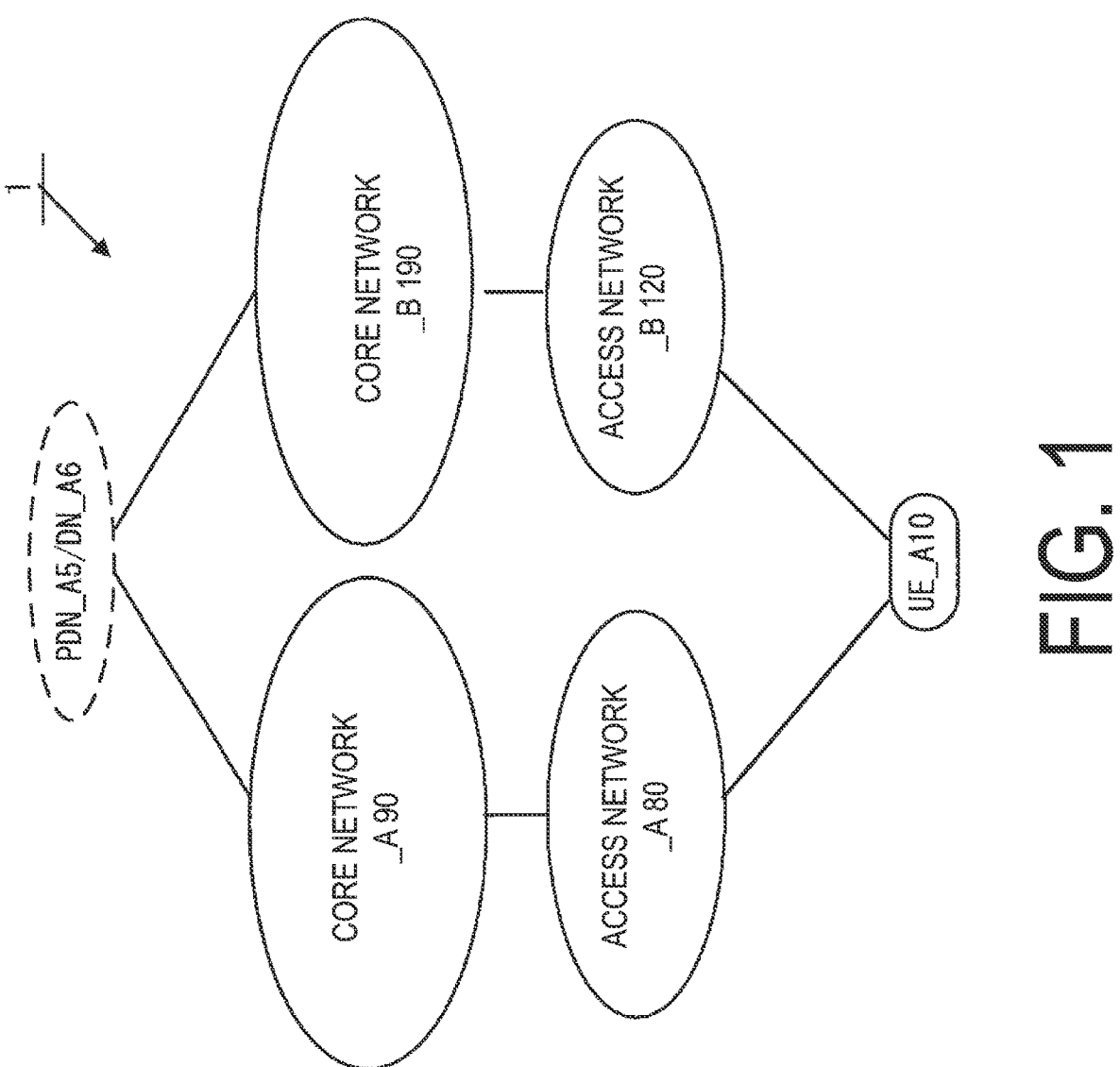
FIG. 1 is a diagram illustrating an overview of a mobile communication system (EPS/5GS).
Figure 2:
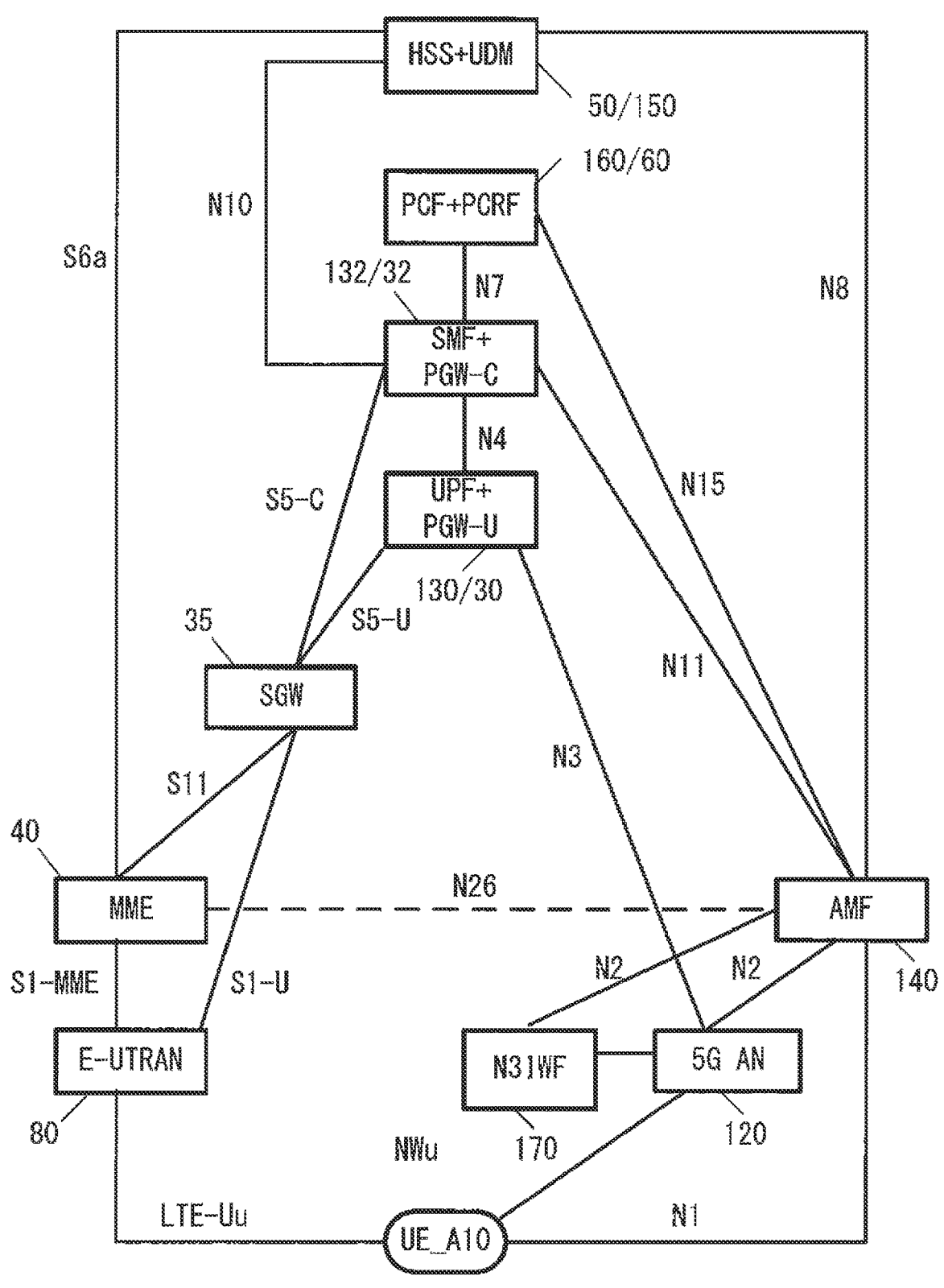
FIG. 2 is a diagram illustrating a detailed configuration of the mobile communication system (EPS/5GS).

First, FIG. 1 is a diagram illustrating an overview of a mobile communication system 1 used in each embodiment, and FIG. 2 is a diagram illustrating a detailed configuration of the mobile communication system 1.

In the illustration of FIG. 1, the mobile communication system 1 includes a UE_A 10, an access network_A 80, a core network_A 90, a Packet Data Network (PDN)_A 5, an access network_B 120, a core network_B 190, and a Data Network (DN)_A 6.

In the following description, the symbols may be omitted, such as in a UE, an access network_A, a core network_A, a PDN, an access network_B, a core network_B, and a DN, in regard to these apparatuses and functions.

Also, FIG. 2 illustrates apparatuses and functions such as a UE_A 10, an E-UTRAN 80, an MME 40, an SGW 35, a PGW-U 30, a PGW-C 32, a PCRF 60, an HSS 50, a 5G AN 120, an AMF 140, a UPF 130, an SMF 132, a PCF 160, a UDM 150, and an N3IWF 170, and interfaces for connecting these apparatuses and functions to each other.

In the following description, the symbols may be omitted, such as in a UE, an E-UTRAN, an MME, an SGW, a PGW-U, a PGW-C, a PCRF, an HSS, a 5G AN, an AMF, a UPF, an SMF, a PCF, a UDM, and an N3IWF, in regard to these apparatuses and functions.

Note that an Evolved Packet System (EPS) that is a 4G system includes the access network_A and the core network_A and may further include the UE and/or the PDN. A 5G System (5GS) that is a 5G system includes the UE, the access network_B, and the core network_B and may further include the DN.

The UE is an apparatus that can be connected to a network service over 3GPP access (also referred to as a 3GPP access network or a 3GPP AN) and/or non-3GPP access (also referred to as a non-3GPP access network or a non-3GPP AN). The UE may be a terminal apparatus capable of performing radio communication, such as a mobile phone or a smartphone, and may be a terminal apparatus that can be connected to both the EPS and the 5GS. The UE may include a Universal Integrated Circuit Card (UICC) and an Embedded UICC (eUICC). Note that the UE may be referred to as a user equipment or a terminal apparatus.

The access network_A corresponds to an Evolved Universal Terrestrial Radio Access Network (E-UTRAN) and/or a radio LAN access network. In the E-UTRAN, one or more evolved Node Bs (eNBs) 45 are deployed. Note that in the following description, the symbol for the eNB 45 may be omitted such as in an eNB. In a case that there are multiple eNBs, the eNBs are connected to each other via, for example, an X2 interface. In the radio LAN access network, one or more access points are deployed.

The access network_B corresponds to a 5G access network (5G AN). The 5G AN includes an NG Radio Access Network (NG-RAN) and/or a non-3GPP access network. In the NG-RAN, one or more NR NodeBs (gNBs) 122 are deployed. Note that in the following description, the symbol for the gNB 122 may be omitted, such as in a gNB. The gNB is a node that provides a New Radio (NR) user plane and control plane to the UE, and is connected to a 5GCN via the NG interface (including the N2 interface or the N3 interface). In other words, the gNB is a base station apparatus newly designed for the 5GS and has functions different from those of the base station apparatus (eNB) used in the EPS that is a 4G system. In a case that there are multiple gNBs, the gNBs are connected to each other via, for example, an Xn interface.

Also, a non-3GPP access network may be an untrusted non-3GPP access network or a trusted non-3GPP access network. Here, the untrusted non-3GPP access network may be a non-3GPP access network that is an access network in which security management is not performed, such as a public wireless LAN, for example. On the other hand, the trusted non-3GPP access network may be an access network defined by 3GPP and may include a trusted non-3GPP access point (TNAP) and a trusted non-3GPP Gateway function (TNGF).

In the following description, the E-UTRAN and the NG-RAN may be referred to as 3GPP access. The radio LAN access network and the non-3GPP AN may be referred to as non-3GPP access. The nodes deployed in the access network B may also be collectively referred to as NG-RAN nodes.

In the following description, the access network_A, and/or the access network_B, and/or an apparatus included in the access network_A, and/or an apparatus included in the access network_B may be referred to as an access network or an access network apparatus.

The core network_A corresponds to an Evolved Packet Core (EPC). In the EPC, for example, a Mobility Management Entity (MME), a Serving Gateway (SGW), a Packet Data Network Gateway (PGW)-U, a PGW-C, a Policy and Charging Rules Function (PCRF), a Home Subscriber Server (HSS), and the like are deployed.

The core network_B corresponds to a 5G Core Network (5GCN). In the 5GCN, for example, an Access and Mobility Management Function (AMF), a User Plane Function (UPF), a Session Management Function (SMF), a Policy Control Function (PCF), a Unified Data Management (UDM), and the like are deployed. Here, the 5GCN may be referred to as a 5GC.

In the following description, the core network_A, and/or the core network_B, an apparatus included in the core network_A, and/or an apparatus included in the core network_B may be referred to as a core network, a core network apparatus, or an intra-core network apparatus.

The core network (the core network_A and/or the core network_B) may refer to an IP mobile communication network operated by a mobile communication operator (Mobile Network Operator MNO)) connecting the access network (the access network_A and/or the access network_B) and the PDN and/or the DN, a core network for a mobile communication operator that operates and manages the mobile communication system 1, or a core network for a virtual mobile communication operator and a virtual mobile communication service provider such as a Mobile Virtual Network Operator (MVNO) and a Mobile Virtual Network Enabler (MVNE).

FIG. 1 illustrates a case that the PDN and the DN are the same; however the PDN and the DN may be different. The PDN may be a Data Network (DN) that provides communication services for the UE. Note that the DN may be configured as a packet data service network or may be configured for each service. In addition, the PDN may include a connected communication terminal. Thus, "to be connected to the PDN" may mean "to be connected to a communication terminal and a server apparatus deployed in the PDN". In addition, "to transmit and/or receive user data to and/or from the PDN" may mean "to transmit and/or receive user data to and/or from a communication terminal and a server apparatus deployed in the PDN". Note that the PDN may be referred to as a DN, and the DN may be referred to as a PDN.

In the following, at least some of the access network_A, the core network_A, the PDN, the access network_B, the core network_B, and the DN, and/or one or more apparatuses included in these may be referred to as a network or a network apparatus. In other words, the expression that "the network and/or the network apparatus transmits and/or receives a message and/or performs a procedure" means that "at least some of the access network_A, the core network_A, the PDN, the access network_B, the core network_B, and the DN, and/or one or more apparatuses included in these transmit and/or receive a message and/or perform a procedure".

The UE can be connected to the access network. The UE can be connected to the core network over the access network. In addition, the UE can be connected to the PDN or the DN over the access network and the core network. In other words, the UE can transmit and/or receive (communicate) user data to and/or from the PDN or the DN. In a case that user data is transmitted and/or received, not only Internet Protocol (IP) communication but also non-IP communication may be used.

Here, IP communication refers to data communication using the IP, and data is transmitted and/or received using IP packets. The IP packet includes an IP header and a payload part. In the payload part, data transmitted and/or received by the apparatuses and functions included in the EPS and the apparatuses and functions included in the 5GS may be included. Non-IP communication refers to data communication not using the IP, where data is transmitted and/or received in a form different from the structure of the IP packets. For example, non-IP communication may be data communication implemented through transmission and/or reception of application data to which an IP header is not added, or user data transmitted and/or received by the UE may be transmitted and/or received with another header such as a MAC header and an Ethernet (trade name) frame header added.

Also, apparatuses which are not illustrated in FIG. 2 may be configured in the access network_A, the core network_A, the access network_B, the core network_B, the PDN_A, and the DN_A. For example, the core network_A and/or the core network_B may include an Authentication Server Function (AUSF) and an Authentication, authorization, and accounting (AAA) server (AAA-S).

Here, an AUSF is a core network apparatus provided with an authentication function for 3GPP access and non-3GPP access. Specifically, the AUSF is a network function unit that receives an authentication request for 3GPP access and/or non-3GPP access from the UE and performs an authentication procedure.

The AAA server is an apparatus that is connected directly to the AUSF or indirectly to the AUSF via another network apparatus and has authentication, authorization, and billing functions. The AAA server may be a network apparatus within the core network. Note that the AAA server may not be included in the core network_A and/or the core network_B and may be included in the PLMN. In other words, the AAA server may be a core network apparatus or may be an apparatus outside the core network. For example, the AAA server may be a server apparatus within the PLMN managed by a third party.

Note that although each of the apparatuses and functions is illustrated one by one for simplicity in FIG. 2, multiple similar apparatuses and functions may be configured in the mobile communication system 1. Specifically, multiple apparatuses and functions such as the UE_A 10, the E-UTRAN 80, the MME 40, the SGW 35, the PGW-U 30, the PGW-C 32, the PCRF 60, the HSS 50, the 5G AN 120, the AMF 140, the UPF 130, the SMF 132, the PCF 160, and/or the UDM 150 may be configured in the mobile communication system 1.

2. Configuration of Each Apparatus

Next, a configuration of each apparatus (the UE, and/or the access network apparatus, and/or the core network apparatus) used in each embodiment will be described with reference to the drawings. Note that each apparatus may be configured as physical hardware, may be configured as logical (virtual) hardware configured in general-purpose hardware, or may be configured as software. At least a part (including all) of the functions of each apparatus may be configured as physical hardware, logical hardware, or software.

Note that each storage unit (a storage unit_A 340, a storage unit_A 440, a storage unit_B 540, a storage unit_A 640, and a storage unit_B 740) in each apparatus and function to be described later includes, for example, a semiconductor memory, a Solid State Drive (SSD), a Hard Disk Drive (HDD), or the like. Each storage unit can store not only information originally configured at the time of being shipped, but also various pieces of information transmitted and/or received to and/or from apparatuses and functions (for example, the UE, and/or the access network apparatus, and/or the core network apparatus, and/or the PDN, and/or the DN) other than the apparatus and functions of each storage unit. Each storage unit can store identification information, control information, flags, parameters, and the like included in a control message transmitted and/or received in various communication procedures to be described later. Each storage unit may store these pieces of information for each UE. In a case that each storage unit performs interworking between the 5GS and the EPS, each storage unit can store a control message and user data transmitted and/or received to and/or from the apparatuses and functions included in the 5GS and/or the EPS. In this case, not only information transmitted and/or received over the N26 interface but also information transmitted and/or received without using the N26 interface can be stored.

2.1. Apparatus Configuration of UE

Figure 3:
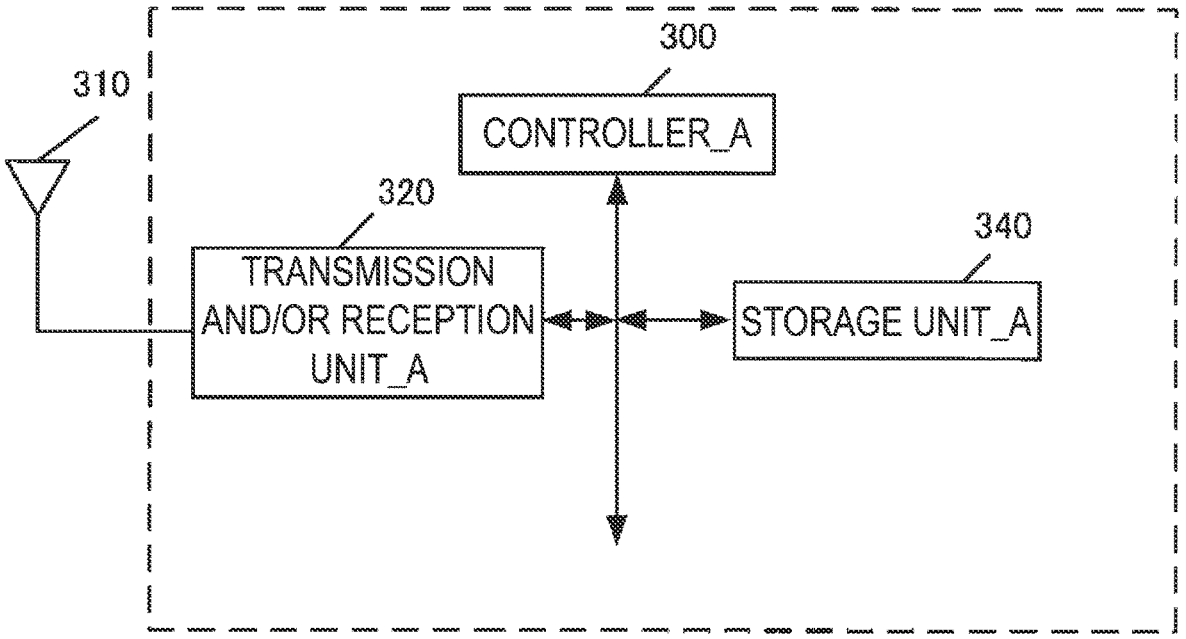
FIG. 3 is a diagram illustrating an apparatus configuration of a UE.

First, an apparatus configuration example of the User Equipment (UE) will be described with reference to FIG. 3. The UE includes a controller_A 300, an antenna 310, a transmission and/or reception unit_A 320, and a storage unit_A 340. The controller_A 300, the transmission and/or reception unit_A 320, and the storage unit_A 340 are connected via a bus. The transmission and/or reception unit_A 320 connects to the antenna 310.

The controller_A 300 is a function unit that controls the entire operations and functions of the UE. The controller_A 300 reads and performs various programs stored in the storage unit_A 340 as necessary, and thereby implements various types of processing in the UE.

The transmission and/or reception unit_A 320 is a function unit for performing radio communication with the base station apparatus (the eNB or the gNB) in the access network via the antenna. In other words, with the use of the transmission and/or reception unit_A 320, the UE can transmit and/or receive user data and/or control information to and/or from the access network apparatus, and/or the core network apparatus, and/or the PDN, and/or the DN.

Following is a detailed description with reference to FIG. 2. With the use of the transmission and/or reception unit_A 320, the UE can communicate with the base station apparatus (eNB) in the E-UTRAN over the LTE-Uu interface. The UE can communicate with the base station apparatus (gNB) in the 5G AN with the use of the transmission and/or reception unit_A 320. The UE can transmit and/or receive a Non-Access-Stratum (NAS) message to and/or from the AMF over the N1 interface with the use of the transmission and/or reception unit_A 320. Note that the N1 interface is a logical interface, and thus communication between the UE and the AMF is actually performed over the 5G AN.

The storage unit_A 340 is a function unit for storing programs, user data, control information, and the like necessary for each operation of the UE.

The UE may have a function of determining whether or not a control message can be transmitted via a certain base station apparatus or access network by associating a frequency band and/or an S-NSSAI for each base station apparatus or access network to store and manage the frequency band and/or the S-NSSAI, based on the control information (including the identification information) received from a network side. The frequency band and/or the S-NSSAI may be associated with a service. In other words, the UE may have a function of determining whether or not a control message can be transmitted via a certain base station apparatus or access network by associating a frequency band and/or an S-NSSAI for each base station apparatus or access network for each service to store and manage the frequency band and/or the S-NSSAI, based on the control information (including the identification information) received from a network side.

2.2. Apparatus Configuration of gNB

Figure 4:
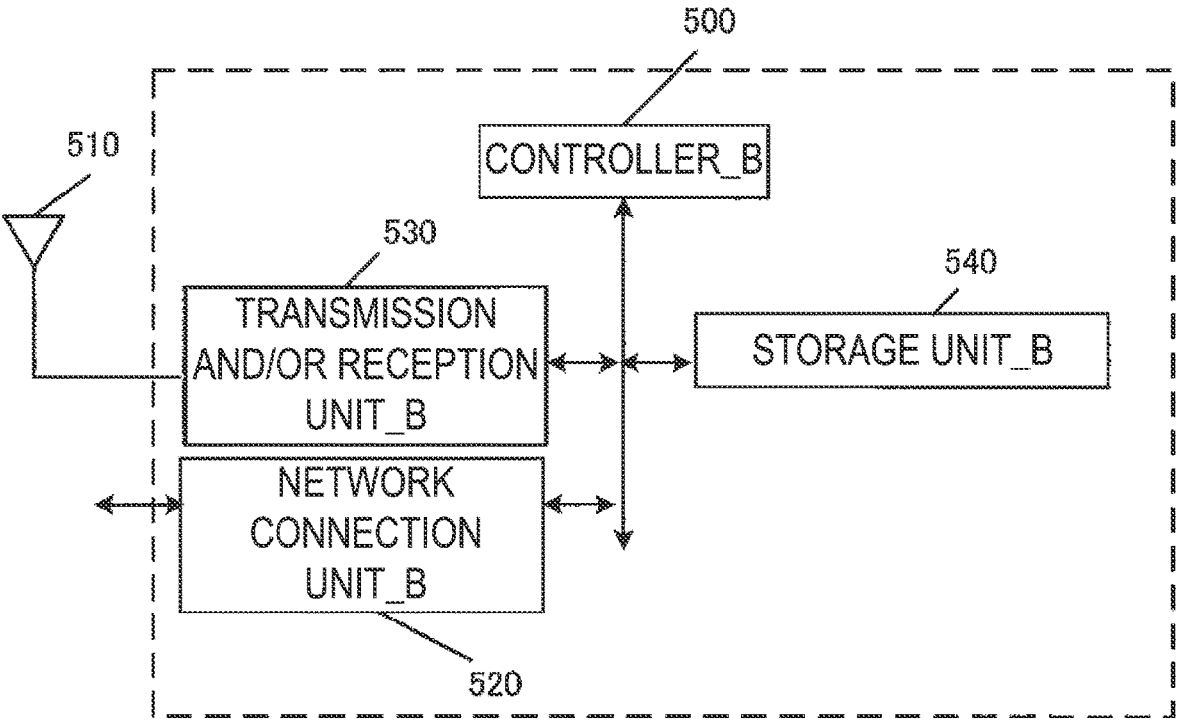
FIG. 4 is a diagram illustrating a configuration of an access network apparatus (gNB) in the 5GS.

Next, an apparatus configuration example of the gNB will be described with reference to FIG. 4. The gNB includes a controller_B 500, an antenna 510, a network connection unit_B 520, a transmission and/or reception unit_B 530, and a storage unit_B 540. The controller_B 500, the network connection unit_B 520, the transmission and/or reception unit_B 530, and the storage unit_B 540 are connected via a bus. The transmission and/or reception unit_B 530 connects to the antenna 510.

The controller_B 500 is a function unit that controls the entire operations and functions of the gNB. The controller_B 500 reads and performs various programs stored in the storage unit_B 540 as necessary, and thereby implements various types of processing in the gNB.

The network connection unit_B 520 is a function unit for the gNB to communicate with the AMF and/or the UPF. In other words, with the use of the network connection unit_B 520, the gNB can transmit and/or receive user data and/or control information to and/or from the AMF and/or the UPF.

The transmission and/or reception unit_B 530 is a function unit for performing radio communication with the UE via the antenna 510. In other words, with the use of the transmission and/or reception unit_B 530, the gNB can transmit and/or receive user data and/or control information to and/or from the UE.

Following is a detailed description with reference to FIG. 2. With the use of the network connection unit_B 520, the gNB in the 5G AN can communicate with the AMF over the N2 interface and can communicate with the UPF over the N3 interface. The gNB can communicate with the UE with use of the transmission and/or reception unit_B 530.

The storage unit_B 540 is a function unit for storing programs, user data, control information, and the like necessary for each operation of the gNB.

The gNB may associate the frequency band and/or the S-NSSAI supported or not supported by the gNB for each base station apparatus or access network to store the frequency band and/or the S-NSSAI. The gNB may associate the frequency band and/or the S-NSSAI supported or not supported by a neighboring base station apparatus for each base station apparatus or access network to store the frequency band and/or the S-NSSAI.

2.3. Apparatus Configuration of AMF

Figure 5:
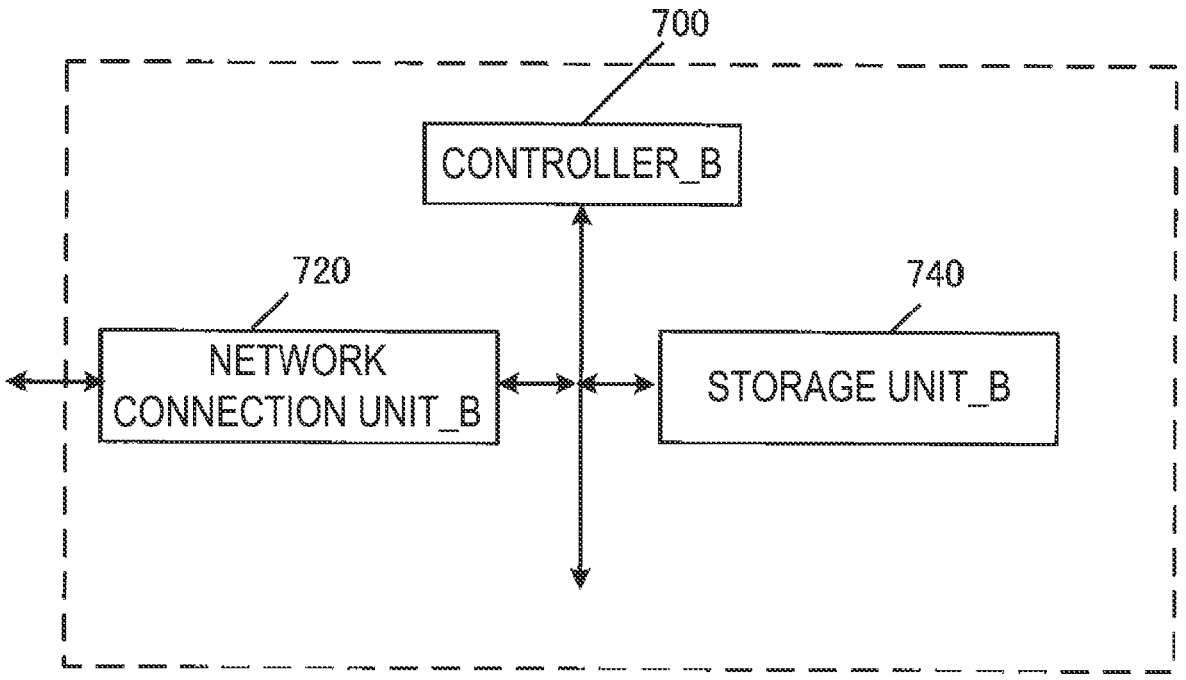
FIG. 5 is a diagram illustrating a configuration of a core network apparatus (AMF/SMF/UPF) in the 5GS.

Next, an apparatus configuration example of the AMF will be described with reference to FIG. 5. The AMF includes a controller_B 700, a network connection unit_B 720, and a storage unit_B 740. The controller_B 700, the network connection unit_B 720, and the storage unit_B 740 are connected via a bus. The AMF may be a node that handles the control plane.

The controller_B 700 is a function unit that controls the entire operations and functions of the AMF. The controller_B 700 reads and performs various programs stored in the storage unit_B 740 as necessary, and thereby implements various types of processing in the AMF.

The network connection unit_B 720 is a function unit for the AMF to connect to the base station apparatus (gNB), and/or the SMF, and/or the PCF, and/or the UDM, and/or the SCEF in the 5G AN. In other words, with the use of the network connection unit_B 720, the AMF can transmit and/or receive user data and/or control information to and/or from the base station apparatus (gNB), and/or the SMF, and/or the PCF, and/or the UDM, and/or the SCEF in the 5G AN.

Following is a detailed description with reference to FIG. 2. With the use of the network connection unit_A 620, the AMF in the 5GCN can communicate with the gNB over the N2 interface, can communicate with the UDM over the N8 interface, can communicate with the SMF over the N11 interface, and can communicate with the PCF over the N15 interface. The AMF can transmit and/or receive a NAS message to and/or from the UE over the N1 interface with the use of the network connection unit_A 620. Note that the N1 interface is a logical interface, and thus communication between the UE and the AMF is actually performed over the 5G AN. In a case that the AMF supports the N26 interface, the AMF can communicate with the MME over the N26 interface with the use of the network connection unit_A 620.

The storage unit_B 740 is a function unit for storing programs, user data, control information, and the like necessary for each operation of the AMF.

The AMF may associate the frequency band and/or the S-NSSAI supported or not supported by the base station apparatus or the access network for each base station apparatus or access network to store the frequency band and/or the S-NSSAI. The gNB may associate the frequency band and/or the S-NSSAI supported or not supported by a neighboring base station apparatus for each base station apparatus or access network to store the frequency band and/or the S-NSSAI.

Note that the AMF has a function of exchanging a control message with the RAN using the N2 interface, a function of exchanging a NAS message with the UE using the N1 interface, a function of performing encryption and integrity protection of a NAS message, a Registration management (RM) function, a Connection management (CM) function, a Reachability management function, a Mobility management function for the UE or the like, a function of transferring a Session Management (SM) message between the UE and the SMF, an Access Authentication (Access Authorization) function, a security anchor function (Security Anchor Functionality (SEA)), a Security Context Management (SCM) function, a function of supporting the N2 interface for a Non-3GPP Interworking Function (N3IWF), a function of supporting transmission and/or reception of a NAS signal with the UE via the N3IWF, a function of authenticating the UE connected via the N3IWF, and the like.

In registration management, an RM state for each UE is managed. The RM state may be synchronized between the UE and the AMF. The RM state includes a deregistered state (RM-DEREGISTERED state) and a registered state (RM-REGISTERED state). In the RM-DEREGISTERED state, the UE is not registered in the network, and thus the AMF is in a state of being unable to reach the UE, because a UE context in the AMF does not have valid location information and routing information for the UE. In the RM-REGISTERED state, the UE is registered in the network, and thus the UE can receive a service that requires registration in the network. Note that the RM state may be referred to as a 5GMM state. In this case, the RM-DEREGISTERED state may be referred to as a 5GMM-DEREGISTERED state, and the RM-REGISTERED state may be referred to as a 5GMM-REGISTERED state.

In other words, 5GMM-REGISTERED may be a state in which each apparatus establishes a 5GMM context, or may be a state in which each apparatus establishes a PDU session context. Note that, in a case that each apparatus is 5GMM-REGISTERED, the UE_A 10 may start transmission and/or reception of user data and a control message, or may respond to paging. In addition, note that, in a case that each apparatus is 5GMM-REGISTERED, the UE_A 10 may perform a registration procedure other than a registration procedure for initial registration, and/or a service request procedure.

In addition, 5GMM-DEREGISTERED may be a state in which each apparatus does not establish the 5GMM context, may be a state in which the location information of the UE_A 10 is not known to the network, or may be a state in which the network is in a state of being unable to reach the UE_A 10. Note that, in a case that each apparatus is 5GMM-DEREGISTERED, the UE_A 10 may initiate the registration procedure, or may perform the registration procedure to thereby establish the 5GMM context.

In connection management, a CM state for each UE is managed. The CM state may be synchronized between the UE and the AMF. The CM state includes a non-connected state (CM-IDLE state) and a connected state (CM-CONNECTED state). In the CM-IDLE state, the UE is in the RM-REGISTERED state, but does not have NAS signaling connection established with the AMF via the N1 interface. In the CM-IDLE state, the UE does not have connection of the N2 interface (N2 connection) and connection of the N3 interface (N3 connection). In contrast, in the CM-CONNECTED state, the UE has NAS signaling connection established with the AMF via the N1 interface. In the CM-CONNECTED state, the UE may have connection of the N2 interface (N2 connection) and/or connection of the N3 interface (N3 connection).

In addition, in connection management, management may be performed separately for the CM state in 3GPP access and the CM state in non-3GPP access. In this case, the CM state in 3GPP access may include a non-connected state in 3GPP access (CM-IDLE state over 3GPP access) and a connected state in 3GPP access (CM-CONNECTED state over 3GPP access). In addition, the CM state in non-3GPP access may include a non-connected state in non-3GPP access (CM-IDLE state over non-3GPP access) and a connected state in non-3GPP access (CM-CONNECTED state over non-3GPP access). Note that the non-connected state may be referred to as an idle mode, and a connected state mode may be referred to as a connected mode.

Note that the CM state may be referred to as a 5GMM mode. In this case, the non-connected state may be referred to as a 5GMM non-connected mode (5GMM-IDLE mode), and the connected state may be referred to as a 5GMM connected mode (5GMM-CONNECTED mode). In addition, the non-connected state in 3GPP access may be referred to as a 5GMM non-connected mode in 3GPP access (5GMM-IDLE mode over 3GPP access), and the connected state in 3GPP access may be referred to as a 5GMM connected mode in 3GPP access (5GMM-CONNECTED mode over 3GPP access). In addition, the non-connected state in non-3GPP access may be referred to as a 5GMM non-connected mode in non-3GPP access (5GMM-IDLE mode over non-3GPP access), and the connected state in non-3GPP access may be referred to as a 5GMM connected mode in non-3GPP access (5GMM-CONNECTED mode over non-3GPP access). Note that the 5GMM non-connected mode may be referred to as an idle mode, and the 5GMM connected mode may be referred to as a connected mode.

One or more AMFs may be deployed in the core network_B. The AMF may be a Network Function (NF) that manages one or more Network Slice Instances (NSIs). The AMF may be a common CP function (Common Control Plane Network Function (CPNF) (CCNF)) shared among multiple NSIs.

Note that, in a case that the UE connects to the 5GS over non-3GPP access, the N3IWF is an apparatus deployed and/or a function allocated between non-3GPP access and the 5GCN.

2.4. Apparatus Configuration of SMF

Next, an apparatus configuration example of the SMF will be described with reference to FIG. 5. The SMF includes a controller_B 700, a network connection unit_B 720, and a storage unit_B 740. The controller_B 700, the network connection unit_B 720, and the storage unit_B 740 are connected via a bus. The SMF may be a node that handles the control plane.

The controller_B 700 is a function unit that controls the entire operations and functions of the SMF. The controller_B 700 reads and performs various programs stored in the storage unit_B 740 as necessary, and thereby implements various types of processing in the SMF.

The network connection unit_B 720 is a function unit for the SMF to connect to the AMF, and/or the UPF, and/or the PCF, and/or the UDM. In other words, with the use of the network connection unit_B 720, the SMF can transmit and/or receive user data and/or control information to and/or from the AMF, and/or the UPF, and/or the PCF, and/or the UDM.

Following is a detailed description with reference to FIG. 2. With the use of the network connection unit_A 620, the SMF in the 5GCN can communicate with the AMF over the N11 interface, can communicate with the UPF over the N4 interface, can communicate with the PCF via the N7 interface, and can communicate with the UDM over the N10 interface.

The storage unit_B 740 is a function unit for storing programs, user data, control information, and the like necessary for each operation of the SMF.

The SMF has a Session Management function such as establishment, modification, and release of a PDU session, a function of IP address allocation to the UE and management thereof, a function of selection and control of the UPF, a function of configuring the UPF for routing traffic to an appropriate destination (transmission destination), a function of transmitting and/or receiving an SM part of a NAS message, a function of issuing a notification about arrival of downlink data (Downlink Data Notification), a function of providing SM information specific to the AN (for each AN) that is transmitted to the AN through the AMF over the N2 interface, a function of determining a Session and Service Continuity mode (SSC mode) for a session, a roaming function, and the like.

2.5. Apparatus Configuration of UPF

Next, an apparatus configuration example of the UPF will be described with reference to FIG. 5. The UPF includes a controller_B 700, a network connection unit_B 720, and a storage unit_B 740. The controller_B 700, the network connection unit_B 720, and the storage unit_B 740 are connected via a bus. The UPF may be a node that handles the control plane.

The controller_B 700 is a function unit that controls the entire operations and functions of the UPF. The controller_B 700 reads and performs various programs stored in the storage unit_B 740 as necessary, and thereby implements various types of processing in the UPF.

The network connection unit_B 720 is a function unit for the UPF to connect to the base station apparatus (gNB), and/or the SMF, and/or the DN in the 5G AN. In other words, with the use of the network connection unit_B 720, the UPF can transmit and/or receive user data and/or control information to and/or from the base station apparatus (gNB), and/or the SMF, and/or the DN in the 5G AN.

Following is a detailed description with reference to FIG. 2. With the use of the network connection unit_A 620, the UPF in the 5GCN can communicate with the gNB over the N3 interface, can communicate with the SMF over the N4 interface, can communicate with the DN over the N6 interface, and can communicate with another UPF over the N9 interface.

The storage unit_B 740 is a function unit for storing programs, user data, control information, and the like necessary for each operation of the UPF.

The UPF has a function as an anchor point for intra-RAT mobility or inter-RAT mobility, a function as an external PDU session point to be mutually connected with the DN (that is, a function of transferring user data as a gateway between the DN and the core network_B), a function of routing and transferring packets, an Uplink Classifier (UL CL) function of supporting routing of multiple traffic flows for one DN, a Branching point function of supporting a multi-homed PDU session, a Quality of Service (QoS) processing function for the user plane, a function of verify-ing uplink traffic, a function of triggering buffering of downlink packets and Downlink Data Notification, and the like.

The UPF may be a gateway for IP communication and/or non-IP communication. The UPF may have a function of transferring IP communication, or a function of conversion between non-IP communication and IP communication. In addition, multiple deployed gateways may be gateways for connecting the core network_B and a single DN. Note that the UPF may have connectivity with another NF, and may connect to each apparatus via another NF.

Note that the user plane refers to user data that is transmitted and/or received between the UE and the network. The user plane may be transmitted and/or received using a PDN connection or a PDU session. In addition, in a case of the EPS, the user plane may be transmitted and/or received using the LTE-Uu interface, and/or the S1-U interface, and/or the S5 interface, and/or the S8 interface, and/or the SGi interface. In addition, in a case of the 5GS, the user plane may be transmitted and/or received over the interface between the UE and the NG RAN, and/or the N3 interface, and/or the N9 interface, and/or the N6 interface. The user plane may be hereinafter referred to as a U-Plane.

In addition, the control plane refers to a control message that is transmitted and/or received in order to perform communication control of the UE or the like. The control plane may be transmitted and/or received using Non-Access-Stratum (NAS) signaling connection between the UE and the MME. In addition, in a case of the EPS, the control plane may be transmitted and/or received using the LTE-Uu interface and the S1-MME interface. In addition, in a case of the 5GS, the control plane may be transmitted and/or received using the interface between the UE and the NG RAN and the N2 interface. The control plane may be hereinafter referred to as a control plane, or may be hereinafter referred to as a C-Plane.

In addition, the User Plane (U-Plane (UP)) may be a communication path for transmitting and/or receiving user data, and may include multiple bearers. In addition, the Control Plane (C-Plane (CP)) may be a communication path for transmitting and/or receiving a control message, and may include multiple bearers.

2.6. Description of Other Apparatuses and/or Functions and Identification Information According to Present Embodiment Next, other apparatuses and/or functions and identification information will be described.

A network refers to at least some of the access network_B, the core network_B, and the DN. One or more apparatuses included in at least a part of the access network_B, the core network_B, and the DN may be referred to as a network or a network apparatus. In other words, "a network transmits and/or receives a message and/or performs processing" may mean "an apparatus (a network apparatus and/or a control apparatus) in the network transmits and/or receives the message and/or performs the processing". Conversely, "an apparatus in a network transmits and/or receives a message and/or performs processing" may mean "the network transmits and/or receives the message and/or performs the processing".

A Network Slice Selection Function (NSSF) may be a network function (also referred to as an NF) having a function of selecting a network slice serving the UE.

A Network Data Analytics Function (NWDAF) may be an NF having a function of performing data collection from an NF and an application function (also referred to as an AF).

A Policy Control Function (PCF) may be an NF having a function of determining a policy for controlling a behavior of a network.

A Network Repository Function (NRF) may be an NF having a service discovery function. The NRF may be an NF that, in a case of receiving a discovery request of another NF from a certain NF, provides information of the discovered NF.

A session management (SM) message (also referred to as a Non-Access-Stratum (NAS) SM message) may be a NAS message used in a procedure for SM, or may be a control message transmitted and/or received between the UE_A 10 and the SMF_A 230 via the AMF_A 240. Furthermore, the SM message may include a PDU session establishment request message, a PDU session establishment accept message, a PDU session reject message (PDU session establishment reject message), a PDU session modification request message, a PDU session modification command message, a PDU session modification complete message (PDU session modification complete), a PDU session modification command reject message, a PDU session modification reject message, a PDU session release request message, a PDU session release reject message, a PDU session release command message, a PDU session release complete message, and the like.

The procedure for SM or the SM procedure may include a PDU session establishment procedure, a PDU session modification procedure, and a PDU session release procedure (UE-requested PDU session release procedure). Note that each procedure may be a procedure initiated by the UE, or may be a procedure initiated by the NW.

A Mobility management (MM) message (also referred to as a NAS MM message) may be a NAS message used in a procedure for MM, or may be a control message transmitted and/or received between the UE_A 10 and the AMF_A 240. Furthermore, the MM message may include a Registration request message, a Registration Accept message, a Registration reject message, a De-registration request message, a De-registration accept message, a configuration update command message, a configuration update complete message, a Service request message, a Service accept message, a Service reject message, a Notification message, a Notification response message, and the like.

The procedure for MM or the MM procedure may include a Registration procedure, a De-registration procedure, a Generic UE configuration update procedure, an authentication and authorization procedure, a Service request procedure, a Paging procedure, and a Notification procedure.

A 5G System (5GS) service may be a connection service provided using the core network_B 190. In addition, the 5GS service may be a service different from an EPS service, or may be a service similar to the EPS service.

A non 5GS service may be a service other than the 5GS service and may include an EPS service and/or a non EPS service.

A Packet Data Network (PDN) type indicates a type of PDN connection and includes IPv4, IPv6, IPv4v6, and non-IP. In a case that IPv4 is specified, it is indicated that transmission and/or reception of data is performed using IPv4. In a case that IPv6 is specified, it is indicated that transmission and/or reception of data is performed using IPv6. In a case that IPv4v6 is specified, it is indicated that transmission and/or reception of data is performed using IPv4 or IPv6. In a case that non-IP is specified, it is indicated that communication is performed using a communication method other than the IP, not communication using the IP.

Although a Protocol Data Unit/Packet Data Unit (PDU) session can be defined as a relationship between the DN that provides a PDU connectivity service and the UE, the PDU session may be connectivity established between the UE and an external gateway. In the 5GS, the UE establishes a PDU session via the access network_B and the core network_B, and can thereby perform transmission and/or reception of user data to and/or from the DN by using the PDU session. Here, the external gateway may be a UPF, an SCEF, or the like. The UE can perform transmission and/or reception of user data to and/or from an apparatus deployed in the DN, such as an application server, by using a PDU session.

Note that each apparatus (the UE, and/or the access network apparatus, and/or the core network apparatus) may associate one or more pieces of identification information with PDU session(s) for management. Note that these pieces of identification information may include one or more of a DNN, a QoS rule, a PDU session type, application identification information, NSI identification information, and access network identification information, and may further include other pieces of information. In addition, in a case that multiple PDU sessions are established, pieces of identification information associated with the PDU sessions may have the same or different details.

The Data Network Name (DNN) may be identification information for identifying the core network and/or an external network such as the DN. In addition, the DNN can also be used as information for selecting a gateway such as the PGW_A 30/UPF_A 235 connecting the core network B 190. In addition, the DNN may correspond to an Access Point Name (APN).

A Protocol Data Unit/Packet Data Unit (PDU) session type indicates a type of PDU session and includes IPv4, IPv6, Ethernet, and Unstructured. In a case that IPv4 is specified, it is indicated that transmission and/or reception of data is performed using IPv4. In a case that IPv6 is specified, it is indicated that transmission and/or reception of data is performed using IPv6. In a case that Ethernet is specified, it is indicated that transmission and/or reception of an Ethernet frame is performed. Alternatively, Ethernet may indicate that communication using the IP is not performed. In a case that Unstructured is specified, it is indicated that data is transmitted and/or received to and/or from an application server in the DN or the like by using a Point-to-Point (P2P) tunneling technique. For the P2P tunneling technique, for example, a UDP/IP encapsulation technique may be used. Note that the PDU session type may include the IP, in addition to the above. The IP can be specified in a case that the UE can use both of IPv4 and IPv6.

The Public land mobile network (PLMN) is a communication network that provides mobile radio communication services. The PLMN is a network managed by an operator who is a network operator, and the operator can be identified by a PLMN ID. A PLMN that matches a Mobile Network Code (MNC) and a Mobile Country Code (MCC) of an International Mobile Subscriber Identity (IMSI) of the UE may be a Home PLMN (HPLMN). Furthermore, the UE may hold, in the USIM, an Equivalent HPLMN list for identifying one or multiple Equivalent HPLMNs (EPLMNs). A PLMN different from the HPLMN and/or the EPLMN may be a VPLMN (Visited PLMN). A PLMN with which the UE has successfully registered may be a Registered PLMN (RPLMN).

A network slice (NS) is a logical network that provides specific network capability and network characteristics. The UE and/or the network can support the network slice (NW slice (NS)) in the 5GS. The network slice may simply be referred to as a slice.

A network slice instance (NSI) includes a set of an instance (entity) of a network function (NF) and necessary resources and forms a network slice to be allocated. Here, the NF is a processing function in a network, and is adopted or defined in 3GPP. The NSI is an entity of one or more NSs configured in the core network_B. The NSI may include a virtual Network Function (NF) generated using a Network Slice Template (NST). Here, the NST is associated with a resource request for provision of a requested communication service and capability, and is a logical expression of one or more NFs. In other words, the NSI may be a set of multiple NFs in the core network_B 190. The NSI may be a logical network configured for classifying user data to be delivered depending on a service or the like. In the NS, one or more NFs may be configured. The NF configured in the NS may or may not be an apparatus shared with another NS. The UE and/or the apparatus in the network can be allocated to one or more NSs, based on an NSSAI, and/or an S-NSSAI, and/or a UE usage type, and/or registration information such as one or more NSI IDs, and/or an APN. Note that the UE usage type is a parameter value included in registration information of the UE, which is used for identifying the NSI. The UE usage type may be stored in the HSS. The AMF may select the SMF and the UPF, based on the UE usage type.

The Single Network Slice Selection Assistance Information (S-NSSAI) is information for identifying the NS. The S-NSSAI may include only a Slice/Service type (SST), or may include both of an SST and a Slice Differentiator (SD). Here, the SST is information indicating operation of the NS expected in terms of functions and services. The SD may be information for interpolating an SST in a case of selecting one NSI out of multiple NSIs indicated by the SST. The S-NSSAI may be information unique to each PLMN or may be standard information common to the PLMNs. The network may store one or more S-NSSAIs in the registration information of the UE as default S-NSSAIs. Note that, in a case that the S-NSSAI is a default S-NSSAI, and the UE does not transmit to a network a valid S-NSSAI in a registration request message, the network may provide an NS related to the UE.

The Network Slice Selection Assistance Information (NS-SAI) is a set of S-NSSAIs. Each S-NSSAI included in the NSSAI is information for assisting the access network or the core network to select the NSI. The UE may store the NSSAI allowed by the network for each PLMN. The NSSAI may be information used for selecting the AMF.

Also, configured NSSAI (also referred to as configuration NSSAI or Configured NSSAI) is NSSAI fed and stored in the UE. The UE may store the configured NSSAI for each PLMN. The configured NSSAI may be information configured by the network (or PLMN). The S-NSSAI included in the configured NSSAI may be represented as configured S-NSSAI. The configured S-NSSAI may include S-NSSAI and mapped S-NSSAI.

Requested NSSAI (also referred to as request NSSAI or Requested NSSAI) is NSSAI provided to the network from the UE during the registration procedure. The requested NSSAI may be allowed NSSAI or configured NSSAI stored by the UE. Specifically, the requested NSSAI may be information indicating a network slice that the UE is to access. The S-NSSAI included in the requested NSSAI may be represented as requested S-NSSAI. For example, the requested NSSAI is transmitted in the NAS message transmitted from the UE to the network such as the registration request message or the PDU session establishment request message, or a Radio Resource Control (RRC) message including the Non-Access-Stratum (NAS) message.

The allowed NSSAI (also referred to as allowed NSSAI or Allowed NSSAI) is information indicating one or multiple network slices allowed for the UE. In other words, the allowed NSSAI is information identifying a network slice to which the UE is allowed by the network to connect. As information of the UE, each of the UE and the network stores and manages the allowed NSSAI for each access (3GPP access or non-3GPP access). The S-NSSAI included in the allowed NSSAI may be represented as allowed S-NSSAI. The allowed S-NSSAI may include S-NSSAI and mapped S-NSSAI.

The mapped S-NSSAI (also referred to as mapped S-NS-SAI or Mapped S-NSSAI) is an S-NSSAI of the HPLMN mapping to the S-NSSAI of a registered PLMN in a roaming scenario. The UE may store one or multiple mapped S-NS-SAIs mapped to the configured NSSAI and the S-NSSAI included in the Allowed NSSAI of each access type. Further, the UE may store one or multiple mapped S-NSSAIs of the S-NSSAI included in a rejected NSSAI.

Rejected NSSAI (also referred to as rejected NSSAI, Rejected NSSAI) is information indicating one or multiple network slices not allowed for the UE. In other words, the rejected NSSAI is information identifying a network slice to which the UE is not allowed by the network to connect. The rejected NSSAI may be information including one or multiple combinations of S-NSSAI and a reject cause value. Here, the reject cause value is information indicating why the network rejects the corresponding S-NSSAI. The UE and the network may each appropriately store and manage the rejected NSSAI based on the reject cause value associated with each S-NSSAI. Furthermore, the rejected NSSAI may be included in the NAS message transmitted from the network to the UE, such as the registration accept message, the configuration update command, the registration reject message, or in the RRC message including the NAS message. The S-NSSAI included in the rejected NSSAI may be represented as rejected S-NSSAI. The rejected NSSAI may be any of the first to third rejected NSSAI and the pending NSSAI, or a combination thereof. The S-NSSAI included in the rejected NSSAI may be represented as rejected S-NS-SAI. The rejected S-NSSAI may include the S-NSSAI and the mapped S-NSSAI.

Here, the first rejected NSSAI is a set of one or more pieces of the S-NSSAI included in the requested NSSAI by the UE, the one or more pieces of S-NSSAI being not available in the current PLMN. The first rejected NSSAI may be Rejected NSSAI for the current PLMN in the 5GS, may be Rejected S-NSSAI for the current PLMN, or may be S-NSSAI included in the Rejected NSSAI for the current PLMN. The first rejected NSSAI may be a rejected NSSAI stored by the UE or the NW, or may be a rejected NSSAI transmitted from the NW to the UE. In a case that the first rejected NSSAI is rejected NSSAI transmitted from the NW to the UE, the first rejected NSSAI may be information including one or multiple combinations of S-NSSAI and a cause value. The reject cause value in this case may be "S-NSSAI is not available in the current PLMN," or may be information indicating that the S-NSSAI associated with the reject cause value is not available in the current PLMN.

The first rejected NSSAI is valid in the entire registered PLMN. In other words, the UE and/or NW may treat the first rejected NSSAI and the S-NSSAI included in the first rejected NSSAI as information not dependent on the access type. In other words, the first rejected NSSAI may be information valid for 3GPP access and non-3GPP access.

In a case that the UE transitions to a deregistered state on both the 3GPP access and the non-3GPP access for the current PLMN, the UE may delete the first rejected NSSAI from storage. In other words, in a case that the UE transitions to the deregistered state for the current PLMN via one access, or successfully registers with a new PLMN via one certain access, or fails to register with a new PLMN via one access and transitions to the deregistered state, and further that the UE is not registered (deregistered state) via the other access, then the UE deletes the first rejected NSSAI.

The second rejected NSSAI is a set of one or multiple S-NSSAIs unavailable in the current registration area among the S-NSSAIs that the UE includes in the requested NSSAI. The second rejected NSSAI may be Rejected NSSAI for the current registration area in the 5GS. The second rejected NSSAI may be a rejected NSSAI stored by the UE or the NW, or may be a rejected NSSAI transmitted from the NW to the UE. In a case that the second rejected NSSAI is rejected NSSAI transmitted from the NW to the UE, the second rejected NSSAI may be information including one or multiple combinations of S-NSSAI and a cause value. The cause value in this case may be "S-NSSAI is not available in the current registration area," or may be information indicating that the S-NSSAI associated with the cause value is not available in the current registration area.

The second rejected NSSAI is valid in the current registration area. In other words, the UE and/or the NW may treat the second rejected NSSAI and the S-NSSAI included in the second rejected NSSAI as information for each access type. In other words, the second rejected NSSAI may be information valid for each of 3GPP access and non-3GPP access. In other words, once the UE transitions to the deregistered state for one access, the UE may delete the second rejected NSSAI from storage.

The third rejected NSSAI is a set of one or multiple S-NSSAIs that require NSSAA and for which NSSAA fails or is revoked. The third rejected NSSAI may be an NSSAI stored by the UE and/or the NW, or may be transmitted from the NW to the UE. In a case that the third rejected NSSAI is transmitted from the NW to the UE, the third rejected NSSAI may be information including one or multiple combinations of S-NSSAI and a reject cause value. The reject cause value in this case may be "S-NSSAI not available due to failure or revocation of NSSAA (S-NSSAI is not available due to the failed or revoked network slice-specific authorization and authentication)", and may be information indicating that NSSAA for the S-NSSAI associated with the reject cause value has failed or has been revoked.

The third rejected NSSAI is valid in the entire registered PLMN. In other words, the UE and/or the NW may treat third rejected NSSAI and S-NSSAI included in the third rejected NSSAI as information not dependent on the access type. In other words, the third rejected NSSAI may be valid information for the 3GPP access and the non-3GPP access. The third rejected NSSAI may be NSSAI different from the rejected NSSAI. The third rejected NSSAI may be the first rejected NSSAI.

The third rejected NSSAI is a rejected NSSAI allowing the UE to identify the slice that is rejected due to failure or revocation of NSSAA from the core network. Specifically, the UE does not initiate the registration request procedure for the S-NSSAI included in the third rejected NSSAI while storing the third rejected NSSAI. The third rejected NSSAI may be identification information including one or multiple S-NSSAIs received from the core network in association with the reject cause value indicating failure of NSSAA. The third rejected NSSAI is information not dependent on the access type. Specifically, in a case of storing the third rejected NSSAI, the UE need not attempt to transmit, either on the 3GPP access or on the non-3GPP access, the registration request message including the S-NSSAI included in the third rejected NSSAI. Alternatively, the UE can transmit the registration request message including the S-NSSAI included in the third rejected NSSAI, based on a UE policy. Alternatively, the UE may delete the third rejected NSSAI based on the UE policy, and transition to a state in which the UE can transmit the registration request message including the S-NSSAI included in the third rejected NSSAI. In other words, in a case of transmitting, based on the UE policy, the registration request message including the S-NSSAI included in the third rejected NSSAI, the UE may delete the S-NSSAI from the third rejected NSSAI.

The pending NSSAI (also referred to as pending NSSAI, Pending NSSAI) is a set of one or multiple S-NSSAIs that require network slice specific authentication by the network, for which the network slice specific authentication has not completed yet, and that are not available in the current PLMN. The pending NSSAI may be a Rejected NSSAI due to NSSAA or a pending NSSAI of the 5GS. The pending NSSAI may be a NSSAI stored by the UE or the NW, and may be an NSSAI transmitted from the NW to the UE. Note that the pending NSSAI is not limited to the rejected NSSAI and may be an NSSAI independent of the rejected NSSAI. In a case that the pending NSSAI is NSSAI transmitted from the NW to the UE, the pending NSSAI may be information including one or multiple combinations of S-NSSAI and a reject cause value. The reject cause value in this case may be "S-NSSAI pending for NSSAA (NSSAA is pending for the S-NSSAI)", or may be information indicating that the UE is prohibited from or awaiting (pending) using the S-NSSAI associated with the reject cause value until NSSAA for the S-NSSAI completes.

The pending NSSAI is valid in the entire registered PLMN. In other words, the UE and/or the NW may treat the third rejected NSSAI and the S-NSSAI included in the pending NSSAI as information not dependent on the access type. In other words, the pending NSSAI may be information valid for the 3GPP access and the non-3GPP access. The pending NSSAI may be NSSAI different from the rejected NSSAI. The pending NSSAI may be first rejected NSSAI.

The pending NSSAI is the NSSAI including one or multiple S-NSSAIs allowing the UE to identify the slice in which the procedure is pending. Specifically, while storing the pending NSSAI, the UE does not initiate the registration request procedure for the S-NSSAI included in the pending NSSAI. In other words, the UE does not use the S-NSSAI included in the pending NSSAI during the registration procedure until NSSAA for the S-NSSAI included in the pending NSSAI completes. The pending NSSAI is identification information including one or multiple S-NSSAIs received from the core network in association with the reject cause value indicating pending for NSSAA. The pending NSSAI is information not dependent on the access type. Specifically, in a case of storing the pending NSSAI, the UE attempts to transmit, neither on the 3GPP access nor on the non-3GPP access, the registration request message including the S-NSSAI included in the pending NSSAI.

A tracking area is a single or multiple ranges that can be expressed using the location information of the UE_A 10 managed by the core network. The tracking area may include multiple cells. In addition, the tracking area may be an area in which a control message such as paging is broadcast, or may be an area in which the UE_A 10 can move without performing a handover procedure. In addition, the tracking area may be a routing area, or may be a location area. The tracking area may be any area as long as the area is similar to these. The tracking area may be hereinafter a Tracking Area (TA). The tracking area may be identified by a Tracking Area Identity (TAI) including a Tracking area code (TAC) and the PLMN.

The Registration area is a set of one or multiple TAs allocated to the UE by the AMF. Note that while moving within one or multiple TAs included in the registration area, the UE_A 10 may be able to move without transmitting and/or receiving a signal for updating the tracking area. In other words, the registration area may be an information group indicating an area in which the UE_A 10 can move without performing the tracking area update procedure. The registration area may be identified with a TAI list including one or multiple TAIs.

A UE ID is information for identifying the UE. Specifically, the UE ID may be a SUbscription Concealed Identifier (SUCI), or a Subscription Permanent Identifier (SUPI), or a Globally Unique Temporary Identifier (GUTI), or an International Mobile Subscriber Identity (IMEI), or an IMEI Software Version (IMEISV), or a Temporary Mobile Subscriber Identity (TMSI), for example. Alternatively, the UE ID may be other information configured by an application or within the network. Moreover, the UE ID may be information for identifying the user.

Network Slice-Specific Authentication and Authorization (NSSAA) is a function for implementing network slice specific authentication and authorization. The network slice-specific authentication and authorization allows the UE to be authenticated and authorized outside the core network, such as in a 3rd Party. The PLMN and the network apparatus having the NSSAA function can perform an NSSAA procedure for a certain S-NSSAI, based on registration information of the UE. Further, the UE having the NSSAA function can manage and store the rejected NSSAI for pending for NSSAA and/or the rejected NSSAI for failure of NSSAA. NSSAA may be herein referred to as a network slice specific authentication and authorization procedure or an authentication and authorization procedure.

The S-NSSAI that requires NSSAA is an S-NSSAI that requires NSSAA managed by the core network and/or the core network apparatus. The core network and/or the core network apparatus may store the S-NSSAI that requires NSSAA by associating the S-NSSAI and information indicating whether or not NSSAA is required. In addition, the core network and/or the core network apparatus may store by associating the S-NSSAI that requires NSSAA and information indicating whether or not NSSAA has completed or information indicating NSSAA has completed and the state is an allowed or success state. The core network and/or the core network apparatus may manage the S-NS-SAI that requires NSSAA as information unrelated to the access network.

A first base station apparatus may be a base station apparatus that supports a first frequency band. In other words, the first base station apparatus may be capable of communicating with the UE by using the first frequency band. In this specification, description is given on the assumption that the first base station apparatus does not support a second frequency band, but the first base station apparatus may support the second frequency band. The first base station apparatus may recognize the first frequency band supported by the first base station apparatus, and/or the first S-NSSAI corresponding to the first frequency band. In addition, the first base station apparatus may recognize the second frequency band supported by a second base station apparatus, and/or the second S-NSSAI corresponding to the second frequency band. Here, the first base station apparatus and the second base station apparatus may be base station apparatuses adjacent to each other. The first base station apparatus may be included in the 3GPP access or the non-3GPP access.

The second base station apparatus may be a base station apparatus that supports the second frequency band different from the first frequency band. In other words, the second base station apparatus may be capable of communicating with the UE by using the second frequency band. In this specification, description is given on the assumption that the second base station apparatus does not support the first frequency band, but the second base station apparatus may support the first frequency band. The second base station apparatus may recognize the second frequency band supported by the second base station apparatus, and/or the second S-NSSAI corresponding to the second frequency band. In addition, the second base station apparatus may recognize the first frequency band supported by the first base station apparatus, and/or the first S-NSSAI corresponding to the first frequency band. The second base station apparatus may be included in the 3GPP access or the non-3GPP access.

The frequency band may be associated with a provided service. For example, in the first frequency band, only a certain service (also referred to as a first service) may be provided, and in the second frequency band, only a service (also referred to as a second service) different from the above-mentioned service may be provided. In the first frequency band, only the second service may be provided, and in the second frequency band, only the first service may be provided. The first service and the second service may be provided in the first frequency band and in the second frequency band. Note that the first service and the second service may be, for example, communication services using Evolved Mobile Broadband (eMBB), Ultra Reliable Low Latency Communication (URLLC), Massive IoT (MIoT), Vehicle-to-Everything (V2X), and a drone, or the like.

Now, description will be given of the identification information transmitted and/or received and stored and managed by apparatuses in the present embodiment.

First, the 1st identification information is information indicating the network slice with which the UE desires to register. The 1st identification information may be information including one or more pieces of S-NSSAI indicating the network slice with which the UE is to be registered. Specifically, the 1st identification information may be the first S-NSSAI corresponding to the first frequency band supported by the first base station apparatus. The 1st identification information may be the first S-NSSAI corresponding to the first frequency band not supported by the second base station apparatus. The 1st identification information may be the S-NSSAI included in the requested NSSAI of the 5GS.

The 2nd identification information is information indicating the network slice with which the UE is to be registered. The 2nd identification information may be information including one or more pieces of S-NSSAI indicating the network slice with which the UE is to be registered. Specifically, the 2nd identification information may be the second S-NSSAI corresponding to the second frequency band supported by the second base station apparatus. The 2nd identification information may be the second S-NSSAI corresponding to the second frequency band not supported by the first base station apparatus. The 2nd identification information may be the S-NSSAI included in the requested NSSAI of the 5GS.

The 3rd identification information is a PDU session ID for identifying a PDU session. The 3rd identification information may be a PDU session ID for identifying a PDU session of which establishment the UE requests.

The 10th identification information is information for indicating the first frequency band supported by the first base station apparatus. The 10th identification information may be information indicating the first frequency band not supported by the second base station apparatus. The 10th identification information may be associated with the first S-NSSAI indicated by the 1st identification information and/or the 11th identification information. The 10th identification information may be information recognized by the first base station apparatus and/or the second base station apparatus and/or the AMF and/or another NF (for example, the NSSF).

The 11th identification information is S-NSSAI corresponding to the first frequency band indicated by the 10th identification information. The S-NSSAI may be the first S-NSSAI or third S-NSSAI. The 11th identification information may be included in the allowed NSSAI transmitted from the network. The 11th identification information may be included in the rejected NSSAI or the pending NSSAI transmitted from the network, or may be transmitted from the network as information different from these. The 11th identification information may be information recognized by the first base station apparatus and/or the second base station apparatus and/or the AMF and/or another NF (for example, the NSSF).

The 12th identification information is information indicating the second frequency band supported by the second base station apparatus. The 12th identification information may be information indicating the second frequency band not supported by the first base station apparatus. The 12th identification information may be associated with the second S-NSSAI indicated by the 2nd identification information and/or the 13th identification information. The 12th identification information may be information recognized by the first base station apparatus and/or the second base station apparatus and/or the AMF and/or another NF (for example, the NSSF).

The 13th identification information may be the S-NSSAI corresponding to the second frequency band indicated by the 12th identification information. The S-NSSAI may be the second S-NSSAI or fourth S-NSSAI. The 13th identification information may be included in the rejected NSSAI transmitted from the network. The 13th identification information may be included in the allowed NSSAI or the pending NSSAI transmitted from the network, or may be transmitted from the network as information different from these. The 13th identification information may be information recognized by the first base station apparatus and/or the second base station apparatus and/or the AMF and/or another NF (for example, the NSSF). The 13th identification information may be the same as the 2nd identification information.

14th identification information is a PDU session ID for identifying a PDU session to be established. The 14th identification information may be the same as the 3rd identification information.

15th identification information is a cause value indicating a reason of rejection of the request of the UE. For example, the 15th identification information may indicate that the network does not support the frequency band indicated by the 12th identification information. The 15th identification information may indicate that the network does not support the S-NSSAI indicated by the 2nd identification information and/or the 13th identification information. The 15th identification information may be associated with the 2nd identification information and/or the 12th identification information and/or the 13th identification information. Simultaneous transmission of the 12th identification information and the 13th identification information may indicate the meaning of the 15th identification information. Note that the 15th identification information may be configured as one piece of identification information including the 15th identification information and the 16th identification information.

16th identification information is a cause value indicating a reason of rejection of the request of the UE. For example, the 16th identification information may indicate that the network does not support the frequency band indicated by the 10th identification information. The 16th identification information may indicate that the network does not support the S-NSSAI indicated by the 1st identification information and/or the 11th identification information. The 16th identification information may be associated with the 1st identification information and/or the 10th identification information and/or the 11th identification information. Simultaneous transmission of the 10th identification information and the 11th identification information may indicate the meaning of the 16th identification information. Note that the 16th identification information may be configured as one piece of identification information including the 15th identification information and the 16th identification information.

3. First Embodiment

3.1. Procedures Used in First Embodiment

First, procedures used in a first embodiment will be described. Procedures used in the first embodiment include a System Information acquisition procedure, a Registration procedure, a PDU session establishment procedure, and the like. Hereinafter, each of the procedures will be described.

Note that, in the first embodiment, a case that each of the combinations including the HSS and the UDM, the PCF and the PCRF, the SMF and the PGW-C, and the UPF and the PGW-U is configured to form a single apparatus/function (that is, the same physical hardware, or the same logical hardware, or the same software) as illustrated in FIG. 2 will be described as an example. However, the details described in the present embodiment can also be applied to a case that each of the combinations is configured to form different apparatuses/functions (that is, different pieces of physical hardware, or different pieces of logical hardware, or different pieces of software). For example, data may be directly transmitted and/or received between these apparatuses, data may be transmitted and/or received over the N26 interface between the AMF and the MME, or data may be transmitted and/or received via the UE.

The present embodiment assumes a state in which the UE is in a cell of the first base station apparatus and is in a cell of the second base station apparatus adjacent to the first base station apparatus, and selects the cell of the first base station apparatus. In other words, since the UE selects the cell of the first base station apparatus, the UE may be in a state capable of communicating with the first base station apparatus. Note that, in a case that the UE selects the cell of the second base station apparatus, the UE may be able to communication with the second base station apparatus. Note that the first base station apparatus may be present in the same Registration Area as that of the second base station apparatus, or may be present in the registration area different from that of the second base station apparatus. The first base station apparatus may be present in the same Tracking Area as that of the second base station apparatus, or may be present in the tracking area different from that of the second base station apparatus. The first base station apparatus may belong to the same PLMN as that of the second base station apparatus, or may belong to the PLMN different from that of the second base station apparatus. In a case that the first base station apparatus and the second base station apparatus belong to different PLMNs, the first base station apparatus may belong to the HPLMN and the second base station apparatus may belong to the VPLMN or the EPLMN, or the first base station apparatus may belong to the VPLMN or the EPLMN and the second base station apparatus may belong to the HPLMN.

3.2. System Information Acquisition Procedure

Figure 8:
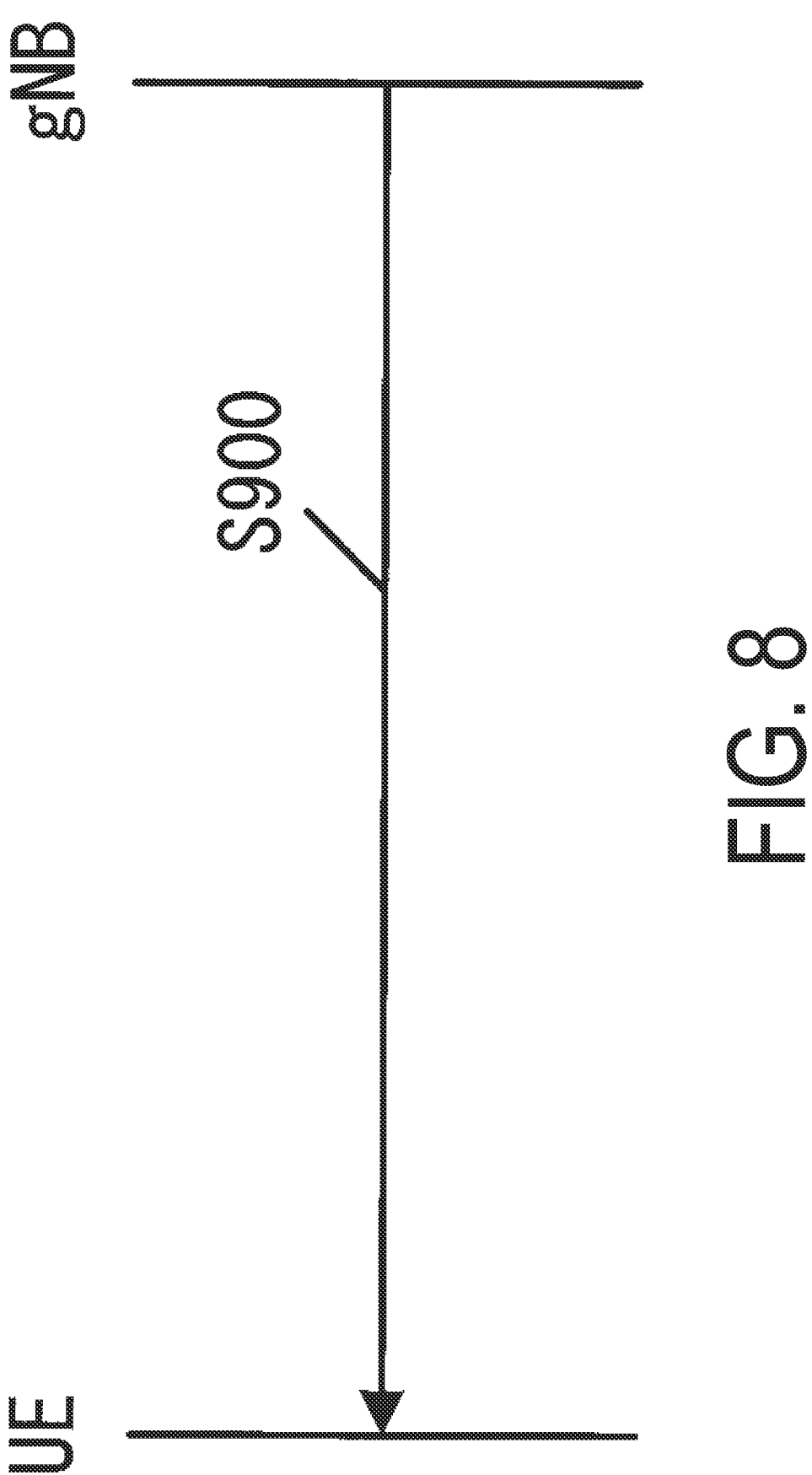
FIG. 8 is a diagram illustrating a system information acquisition procedure.

The first base station apparatus can periodically transmit system information (S900 of FIG. 8). The system information may be configured as a control message of a Radio Resource Control (RRC) layer, that is, an RRC message. The system information may include a Master Information Block (MIB) and a System Information Block (SIB). The 10th to 13th identification information may be transmitted in the MIB and/or the SIB.

In a case that the UE receives the system information transmitted from the first base station apparatus (S900 of FIG. 8), in a case that each piece of identification information is included in the system information, the UE can recognize details of each piece of identification information.

Based on reception of the 10th identification information or the system information including the 10th identification information, the UE may recognize the first frequency band supported by the first base station apparatus and not supported by the second base station apparatus.

Based on reception of the 11th identification information or the system information including the 11th identification information, the UE may recognize the first S-NSSAI corresponding to the first frequency band.

Based on reception of the 12th identification information or the system information including the 12th identification information, the UE may recognize the second frequency band not supported by the first base station apparatus and supported by the second base station apparatus.

Based on reception of the 13th identification information or the system information including the 13th identification information, the UE may recognize the second S-NSSAI corresponding to the second frequency band.

Based on reception of the 10th identification information, and/or the 11th identification information, and/or the system information including the 10th and/or 11th identification information, the UE may determine that the UE can transmit a control message (for example, a registration request message, and/or a PDU session establishment request message, and/or an N1 SM container, and/or an NAS message) including the 1st identification information to the first base station apparatus.

Based on reception of the 10th identification information, and/or the 11th identification information, and/or the system information including the 10th and/or 11th identification information, in a case that the UE reselects the cell of the second base station apparatus and reselects the cell of the first base station apparatus again within a prescribed period, the UE may determine that the UE can transmit a control message (for example, a registration request message, and/or a PDU session establishment request message, and/or an N1 SM container, and/or an NAS message) including the 1st identification information to the first base station apparatus.

Based on reception of the 10th identification information, and/or the 11th identification information, and/or the system information including the 10th and/or 11th identification information, in a case that the UE reselects the cell of the second base station apparatus, the UE may determine that the UE cannot transmit a control message (for example, a registration request message, and/or a PDU session establishment request message, and/or an N1 SM container, and/or an NAS message) including the 1st identification information to the second base station apparatus.

Based on reception of the 12th identification information, and/or the 13th identification information, and/or the system information including the system information including the 12th and/or 13th identification information, the UE may determine that the UE cannot transmit a control message (for example, a registration request message, and/or a PDU session establishment request message, and/or an N1 SM container, and/or an NAS message) including the 2nd identification information to the first base station apparatus.

Based on reception of the 12th identification information, and/or the 13th identification information, and/or the system information including the 12th and/or 13th identification information, the UE may perform cell reselection, and/or PLMN selection, and/or access network selection.

Based on reception of the 12th identification information, and/or the 13th identification information, and/or the system information including the 12th and/or 13th identification information, in a case that the UE reselects the cell of the second base station apparatus, the UE may determine that the UE can transmit a control message (for example, a registration request message, and/or a PDU session establishment request message, and/or an N1 SM container, and/or an NAS message) including the 2nd identification information to the second base station apparatus.

Note that the second base station apparatus can also similarly periodically transmit the system information; however, in a case that the UE selects the first base station apparatus, the system information transmitted from the second base station apparatus cannot be received. In contrast, in a case that the UE selects the second base station apparatus, the system information transmitted from the second base station apparatus cannot be received. The system information transmitted from the second base station apparatus may be the same as the above-described system information transmitted from the first base station apparatus, and in a case that the UE receives the system information transmitted from the second base station apparatus, the UE may perform the same determination as that described above.

3.3. Registration Procedure

Figure 6:
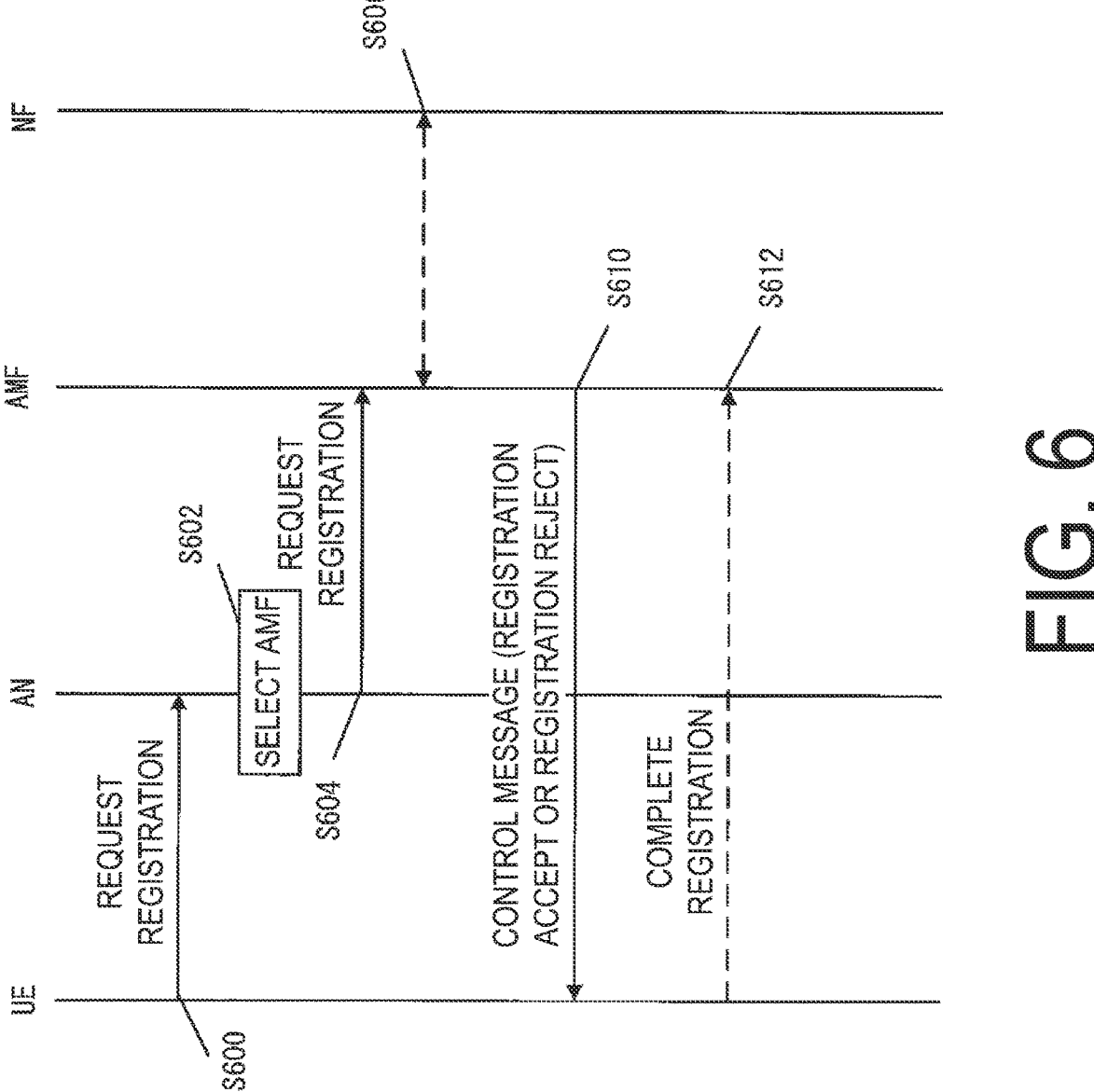
FIG. 6 is a diagram illustrating a registration procedure.

Next, the Registration procedure will be described with reference to FIG. 6. In the present section, the registration procedure may be simply referred to as the present procedure. The registration procedure is a procedure for registration with the access network_B, and/or the core network_B, and/or the DN as initiated by the UE. In a case that the UE is in a state of not being registered with the network, for example, the UE can perform the present procedure at any timing such as the timing at which the UE is turned on. In other words, the UE can initiate the present procedure at any timing in a case that the UE is in the deregistered state (5GMM-DEREGISTERED state). Each apparatus (in particular, the UE and the AMF) can transition to the registered state (5GMM-REGISTEDED state), based on completion of the registration procedure. Note that each registered state may be managed by each apparatus for each access. Specifically, each apparatus may independently manage the registration state (registered state or deregistered state) for the 3GPP access and the registration state for the non-3GPP access.

In addition, the registration procedure may be a procedure for updating position registration information of the UE in the network, and/or periodically giving a notification of the state of the UE from the UE to the network, and/or updating a specific parameter related to the UE in the network.

As described above, the following description is given assuming a state in which the UE selects the cell of the first base station apparatus.

In a case that the UE performs mobility for crossing a TA, the UE may initiate the registration procedure. In other words, in a case that the UE moves to a TA that is different from the TA indicated in the stored TA list, the UE may initiate the registration procedure. In addition, the UE may initiate the registration procedure in a case that a context of each apparatus needs to be updated due to disconnection and deactivation of a PDU session. In addition, in a case that there is a change in capability information and/or a preference, related to PDU session establishment, of the UE, the UE may initiate the registration procedure. In addition, the UE may periodically initiate the registration procedure. In addition, the UE may initiate the registration procedure, based on completion of the registration procedure, or completion of the PDU session establishment procedure, or information received from the network in each procedure. Note that these are not restrictive, and the UE can perform the registration procedure at any timing.

Note that the above-described procedure for the UE to transition from the state (deregistered state) of not being registered with the network to the state (registered state) of being registered therewith may be an initial registration procedure or a registration procedure for initial registration. The registration procedure performed in the state (registered state) in which the UE is registered with the network may be a registration procedure for mobility and periodic registration update or a mobility and periodic registration procedure.

First, the UE initiates the registration procedure by transmitting the Registration request message to the AMF (S600), (S602), and (S604). Specifically, the UE transmits an RRC message including the registration request message to the first base station apparatus (also referred to as a 5G AN or a gNB) (S600). Moreover, the registration request message is an NAS message transmitted and/or received over the N1 interface. The RRC message may be a control message transmitted and/or received between the UE and the first base station apparatus. The NAS message is processed in the NAS layer, and the RRC message is processed in the RRC layer. Note that the NAS layer is a layer higher than the RRC layer.

Here, the UE can transmit the 1st identification information in the registration request message and/or the RRC message. Here, the 1st identification information may be as described in section 2.6. Furthermore, the UE may include and transmit identification information indicating the type of the present procedure, in the registration request message and/or the RRC message. Here, the identification information indicating the type of the present procedure may be a 5GS registration type Information Element (IE), and may be information indicating that the present procedure is the registration procedure performed for an initial registration, or for update of registration information associated with movement, or for periodic update of registration information, or for emergency registration.

The UE may include UE capability information in the registration request message to notify the network of the functions supported by the UE. Here, the capability information of the UE may be 5GMM capability IE of the 5GS.

The UE may transmit these pieces of identification information in a control message different from these, for example, a control message of a layer (for example, a Medium Access Control (MAC) layer, a Radio Link Control (RLC) layer, a Packet Data Convergence Protocol (PDCP) layer, a Service Data Adaptation Protocol (SDAP) layer, or the like) lower than the RRC layer. Note that, by transmitting these pieces of identification information, the UE may indicate that the UE supports each function, may indicate a request of the UE, or may indicate both of these.

Note that the UE may select or determine whether to transmit the 1st identification information to the network based on the UE capability information, and/or the UE policy, and/or the UE state, and/or the user registration information, and/or a context stored in the UE, and/or the like.

Further, in a case that the UE includes the NSSAA function, or requests at least one S-NSSAI for identifying a slice that requires NSSAA, the UE may include in the registration request message as the capability information for transmission. By transmitting the capability information, the UE may request the network to treat the UE as a UE with the NSSAA function, and to perform, in the procedure related to the UE, an authentication and authorization procedure based on the NSSAA function.

The UE may store the allowed NSSAI, the configured NSSAI, the rejected NSSAI, and the mapped S-NSSAI.

The UE may include information other than the 1st identification information in the registration request message and/or the RRC message, and may include and transmit, for example, the UE ID and/or the PLMN ID and/or the AMF identification information. Here, the AMF identification information may be information for identifying an AMF or a set of AMFs, and may be, for example, a 5G S-Temporary Mobile Subscription Identifier (5G-S-TMSI) or a Globally Unique AMF Identifier (GUAMI).

In a case that the first base station apparatus receives an RRC message including the registration request message, the first base station apparatus selects the AMF to which the registration request message is transferred (S602). Note that the first base station apparatus can select the AMF, based on the identification information included in the registration request message and/or the RRC message. Specifically, in a case that the first base station apparatus receives the 1st identification information, the first base station apparatus may select the AMF as a transmission destination of the registration request message, based on the 1 st identification information. Specifically, the first base station apparatus may select the AMF included in the network slice identified by the 1st identification information, or the AMF having connectivity to the network slice identified by the 1st identification information.

Note that the method of selecting the AMF is not limited thereto, and the first base station apparatus may select the AMF, based on a condition other than the above.

The first base station apparatus extracts the registration request message from the received RRC message and transfers the registration request message to the selected AMF (S604). Note that in a case that the 1st identification information is not included in the registration request message but in the RRC message, the identification information included in the RRC message may be transferred to the selected AMF together with the registration request message (S604).

In a case that the AMF receives the registration request message, the AMF can perform the first condition fulfillment determination. The first condition fulfillment determination is a condition fulfillment determination for determining whether or not the network accepts the request from the UE. In a case that the AMF determines that the first condition fulfillment determination is true, the AMF may perform the procedure of S610 to S612. Alternatively, in a case that the AMF determines that the first condition fulfillment determination is false, the AMF may perform the procedure of S610.

The first condition fulfillment determination may be performed by a network function (also referred to as an NF) other than the AMF. The NF may be, for example, a Network Slice Selection Function (NSSF), a Network Data Analytics Function (NWDAF), or a Policy Control Function (PCF). In a case that the NF other than the AMF performs the first condition fulfillment determination, the AMF may provide the NF with at least a part of information necessary for performing the first condition fulfillment determination, specifically, information received from the UE (S606). Then, in a case that the NF determines true or false of the first condition fulfillment determination based on the information received from the AMF, the NF may notify the AMF of information including results (in other words, true or false) of the first condition fulfillment determination. The AMF may determine the identification information and/or the control message to be transmitted to the UE, based on the results of the first condition fulfillment determination received from the NF.

Note that, in a case that the first condition fulfillment determination is true, the control message transmitted and/or received in S610 may be the Registration accept message. In a case that the first condition fulfillment determination is false, the control message transmitted and/or received in S610 may be the Registration reject message.

Note that the first condition fulfillment determination may be performed based on reception of the registration request message, and/or each piece of identification information included in the registration request message, and/or subscriber information, and/or capability information of the network, and/or an operator policy, and/or a network state, and/or registration information of a user, and/or a context stored in the AMF, and/or the like.

For example, in a case that the network allows the request of the UE, the first condition fulfillment determination may be determined as true, whereas in a case that the network does not allow the request of the UE, the first condition fulfillment determination may be determined as false. In a case that a network with which the UE is to be registered and/or an apparatus in the network supports the function requested by the UE, the first condition fulfillment determination may be determined as true, whereas in a case that the network and/or the apparatus does not support the function requested by the UE, the first condition fulfillment determination may be determined as false. In addition, in a case that the transmitted and/or received identification information is allowed, the first condition fulfillment determination may be determined as true, whereas in a case that the transmitted and/or received identification information is not allowed, the first condition fulfillment determination may be determined as false.

In a case that the S-NSSAI included in the requested NSSAI received by the AMF from the UE is information for identifying a slice that requires the NSSAA procedure, and further, in a case that the AMF stores success for results of the NSSAA procedure of a corresponding S-NSSAI for the UE, the first condition fulfillment determination may be determined as true. Alternatively, in a case that there is no S-NSSAI allowed for the UE, and there is no plan of allocating the Allowed NSSAI to the UE in future either, the first condition fulfillment determination may be determined as false.

The AMF may transmit one or more pieces of identification information out of the 10th to 13th identification information in a control message. Here, the 10th to 13th identification information may be as described in section 2.6. Note that, by transmitting these pieces of identification information and/or the control message, the AMF may indicate that the network supports the functions, may indicate that the request from the UE is accepted, may indicate that the request from the UE is not allowed, or may indicate information obtained by combining the above-described pieces of information. Furthermore, in a case that multiple pieces of identification information are transmitted and/or received, two or more pieces of identification information of these pieces of identification information may be configured as one or more pieces of identification information. Note that information indicating support of each function and information indicating a request for use of each function may be transmitted and/or received as the same piece of identification information, or may be transmitted and/or received as different pieces of identification information.

In a case that the AMF receives the 1st identification information from the UE, and/or configuration information of the UE is updated after the previous registration procedure, the AMF may transmit the 10th to 13th identification information in a control message.

Specifically, in a case that the AMF receives the registration request message including the 1st identification information from the UE via the first base station apparatus, the AMF may transmit a control message including the 10th identification information, and/or the 11th identification information, and/or the 12th identification information, and/or the 13th identification information.

Even in a case that the AMF receives the registration request message not including the 1st identification information from the UE via the first base station apparatus, the AMF may transmit a control message including the 10th identification information, and/or the 11th identification information, and/or the 12th identification information, and/or the 13th identification information.

The AMF may further include the configured NSSAI, and/or the allowed NSSAI, and/or the rejected NSSAI, and/or the pending NSSAI in the control message for transmission. Note that the 10th to 13th identification information may be included in the allowed NSSAI, and/or the rejected NSSAI, and/or the pending NSSAI for transmission, or may be transmitted as information different from the above-described pieces of information.

In a case that the AMF is scheduled to perform the NSSAA procedure after completion of the present procedure or in parallel with the present procedure although there is no S-NSSAI (allowed NSSAI) allowed for the UE at the time of transmission of the control message, or the AMF is in the middle of performing the NSSAA procedure between the UE and the network, or the AMF includes the pending NSSAI in the control message for transmission, the AMF may include an empty value in the allowed NSSAI for transmission.

Note that the AMF may determine at least which piece of identification information out of the 10th to 13th identification information is to be included in the control message, based on each piece of received identification information, and/or subscriber information, and/or capability information of the network, and/or an operator policy, and/or a state of the network, and/or registration information of a user, and/or a context stored in the AMF, and/or the like.

By transmitting the registration accept message based on each piece of received identification information, and/or subscriber information, and/or capability information of the network, and/or the operator policy, and/or the state of the network, and/or the registration information of the user, and/or the context stored in the AMF, and/or the like, the AMF may indicate that the request from the UE is accepted, or by transmitting the registration reject message, the AMF may indicate that the request from the UE is rejected.

The UE receives the control message (the registration accept message or the registration reject message) and/or the 10th to 13th identification information via the first base station apparatus (S610). In a case that the control message is the registration accept message, then by receiving the registration accept message, the UE can recognize that the request from the UE on the registration request message is accepted, and recognize details of various pieces of identification information included in the registration accept message. In a case that the control message is the registration reject message, the UE can recognize that the request from the UE using the registration request message has been rejected and the details of various kinds of identification information included in the registration reject message by receiving the registration reject message.

Based on reception of the 10th identification information or a control message including the 10th identification information, the UE may recognize the first frequency band supported by the first base station apparatus and not supported by the second base station apparatus.

Based on reception of the 11th identification information or a control message including the 11th identification information, the UE may recognize the first S-NSSAI corresponding to the first frequency band.

Based on reception of the 12th identification information or a control message including the 12th identification information, the UE may recognize the second frequency band not supported by the first base station apparatus and supported by the second base station apparatus.

Based on reception of the 13th identification information or a control message including the 13th identification information, the UE may recognize the second S-NSSAI corresponding to the second frequency band.

Based on reception of the 10th identification information, and/or the 11th identification information, and/or a control message including the 10th and/or 11th identification information, the UE may determine that the UE can transmit a control message (for example, a registration request message, and/or a PDU session establishment request message, and/or an N1 SM container, and/or an NAS message) including the 1st identification information to the first base station apparatus.

In a case that the UE reselects the cell of the second base station apparatus and reselects the cell of the first base station apparatus again within a prescribed period based on reception of the 10th identification information, and/or the 11th identification information, and/or a control message including the 10th and/or 11th identification information, the UE may determine that the UE can transmit a control message (for example, a registration request message, and/or a PDU session establishment request message, and/or an N1 SM container, and/or an NAS message) including the 1st identification information to the first base station apparatus.

In a case that the UE reselects the cell of the second base station apparatus based on reception of the 10th identification information, and/or the 11th identification information, and/or a control message including the 10th and/or 11th identification information, the UE may determine that the UE cannot transmit a control message (for example, a registration request message, and/or a PDU session establishment request message, and/or an N1 SM container, and/or an NAS message) including the 1st identification information to the second base station apparatus.

Based on reception of the 12th identification information, and/or the 13th identification information, and/or a control message including the 12th and/or 13th identification information, the UE may determine that the UE cannot transmit a control message (for example, a registration request message, or a PDU session establishment request message, and/or an N1 SM container, and/or a NAS message) including the 2nd identification information to the first base station apparatus.

Based on reception of the 12th identification information, and/or the 13th identification information, and/or a control message including the 12th and/or 13th identification information, the UE may perform cell reselection, and/or PLMN selection, and/or access network selection.

In a case that the UE reselects the cell of the second base station apparatus based on reception of the 12th identification information, and/or the 13th identification information, and/or a control message including the 12th and/or 13th identification information, the UE may determine that the UE can transmit a control message (for example, a registration request message, or a PDU session establishment request message, and/or an N1 SM container, and/or a NAS message) including the 2nd identification information to the second base station apparatus.

Note that, in a case that the UE acquires the 10th to 13th identification information in the procedure of section 3.2, the UE need not acquire the 10th to 13th identification information in the procedure of section 3.3.

Note that, in a case that the UE does not acquire the 10th to 13th identification information in the procedure of section 3.2, the UE may acquire the 10th to 13th identification information in the procedure of section 3.3.

Note that, after acquiring the 10th to 13th identification information in the procedure of section 3.2, the UE may additionally acquire the 10th to 13th identification information in the procedure of section 3.3. In this case, the UE may update information related to the 10th to 13th identification information acquired in the procedure of section 3.2 to the details acquired in the procedure of section 3.3.

Further, in a case that the control message is the registration accept message, the UE can transmit a registration complete message to the AMF via the first base station apparatus as a response message to the registration accept message (S612). Here, the registration complete message is a NAS message transmitted and/or received on the N1 interface, but may be transmitted and/or received in an RRC message between the UE and the first base station apparatus.

The AMF receives the registration complete message via the first base station apparatus (S612). Each apparatus completes the present procedure based on transmission and/or reception of the registration accept message and/or the registration complete message.

Each apparatus may complete the registration procedure based on the transmission and/or reception of the registration reject message.

Note that each apparatus may transition to or maintain a state in which the UE is registered with the network (an RM_REGISTERED state or a 5GMM-REGISTERED state) based on the transmission and/or reception of the registration accept message and/or the registration complete message or may transition to or maintain a state in which the UE is not registered with the network (an RM_DEREGIS-TERED state or a 5GMM-DEREGISTERED state) over the access in which the UE has received the registration reject message for the current PLMN based on the transmission and/or reception of the registration reject message. Also, the transition of each apparatus to each state may be performed based on reception of the registration complete message or completion of the registration procedure.

In addition, each apparatus may perform processing based on information transmitted and/or received in the registration procedure based on completion of the registration procedure. For example, in a case that information indicating that a part of the request from the UE is rejected is transmitted and/or received, a reason of rejection of the request from the UE may be recognized. In addition, each apparatus may perform the present procedure again or may perform the registration procedure on the core network_A or another cell based on the cause for the rejection of the request from the UE.

Moreover, the UE may store the identification information received along with the registration accept message and/or the registration reject message or may recognize determination of the network, based on the completion of the registration procedure.

Note that the registration procedure described in the present section may be the registration procedure for initial registration, or may be the registration procedure for mobility and periodic registration.

3.4. Registration Procedure Via First Base Station Apparatus

Next, a behavior of each apparatus of a case that the UE that has acquired at least one of the 10th to 13th identification information by performing the procedure of section 3.2 and/or section 3.3 performs the registration procedure via the first base station apparatus will be described with reference to FIG. 6. A behavior of each apparatus of a case that the UE that has not acquired the 10th to 13th identification information, although the UE has performed the procedure of section 3.2 and/or section 3.3, or because the UE does not perform the procedure of section 3.2 and/or section 3.3, performs the registration procedure via the first base station apparatus will be described as well. In the present section, the registration procedure via the first base station apparatus may be simply referred to as the present procedure or the registration procedure.

Note that the present procedure may be performed after the procedures from section 3.4 to section 3.7 are performed one or more times.

The UE may initiate the present procedure on the same condition as that of section 3.3. Each apparatus (in particular, the UE and the AMF) can transition to the registered state (5GMM-REGISTEDED state), based on completion of the registration procedure. Note that each registered state may be managed by each apparatus for each access. Specifically, each apparatus may independently manage the registration state (registered state or deregistered state) for the 3GPP access and the registration state for the non-3GPP access.

In addition, the registration procedure may be a procedure for updating position registration information of the UE in the network, and/or periodically giving a notification of the state of the UE from the UE to the network, and/or updating a specific parameter related to the UE in the network.

The procedure for the UE to transition from the state (deregistered state) of not registered with the network to the state (registered state) of being registered therewith and the registration procedure performed in the state (registered state) in which the UE is registered with the network may be the same as those of section 3.3.

In the following, description is given assuming a state in which the UE has selected the cell of the first base station apparatus.

First, the UE initiates the registration procedure by transmitting the registration request message to the AMF (S600) (S602) and (S604). Specifically, the UE transmits the RRC message including the registration request message to the first base station apparatus (S600).

Here, the UE can transmit at least one of the 1st to 2nd identification information in the registration request message and/or the RRC message. Here, the 1st to 2nd identification information may be as described in section 2.6. In addition, the UE may transmit identification information indicating a type of the present procedure and/or capability information of the UE in the registration request message and/or the RRC message. Here, the identification information indicating a type of the present procedure and the capability information of the UE may be the same as those of section 3.3.

The UE may transmit these pieces of identification information in a control message different from these, for example, a control message of a layer (for example, a MAC layer, an RLC layer, a PDCP layer, an SDAP layer, or the like) lower than the RRC layer. Note that, by transmitting these pieces of identification information, the UE may indicate that the UE supports each function, may indicate a request of the UE, or may indicate both of these. Furthermore, in a case that multiple pieces of identification information are transmitted and/or received, two or more pieces of identification information of these pieces of identification information may be configured as one or more pieces of identification information.

Note that the UE may determine whether to transmit which of the 1 st to 2nd identification information to the network based on the UE capability information, and/or the UE policy, and/or the UE state, and/or the user registration information, and/or a context stored in the UE, and/or the like.

In particular, in a case that the UE has not acquired the 10th to 13th identification information, the UE may determine whether to transmit the 1st to 2nd identification information to the network, based on the above.

For example, in a case that the UE has not acquired the 10th to 13th identification information, in the present procedure, the UE may transmit the 1st to 2nd identification information to the first base station apparatus.

In other words, in a case that the UE does not determine that the UE can transmit a control message including the 1st identification information to the first base station apparatus, or the UE does not determine that the UE cannot transmit a control message including the 2nd identification information to the first base station apparatus in the procedure of section 3.2 and/or section 3.3, in the present procedure, the UE may transmit the registration request message and/or the RRC message including the 1st identification information and/or the 2nd identification information to the first base station apparatus.

In a case that the UE has already acquired at least one of the 10th to 13th identification information, the UE may determine whether to transmit the 1st to 2nd identification information to the network, in consideration of not only the above but also the acquired identification information.

For example, in a case that the UE has already acquired at least one of the 10th to 13th identification information, the UE may transmit the 1st identification information and may not transmit the 2nd identification information to the first base station apparatus, based on the acquired identification information.

In other words, in a case that the UE determines that the UE can transmit a control message including the 1st identification information to the first base station apparatus in the procedure of section 3.2 and/or section 3.3, in the present procedure, the UE may transmit the registration request message and/or the RRC message including the 1st identification information to the first base station apparatus.

In a case that the UE determines that the UE cannot transmit a control message including the 2nd identification information to the first base station apparatus in the procedure of section 3.2 and/or section 3.3, in the present procedure, the UE may not transmit the registration request message and/or the RRC message including the 2nd identification information to the first base station apparatus.

Further, in a case that the UE includes the NSSAA function, or requests at least one S-NSSAI for identifying a slice that requires NSSAA, the UE may include in the registration request message as the capability information for transmission. By transmitting the capability information, the UE may request the network to treat the UE as a UE with the NSSAA function, and to perform, in the procedure related to the UE, an authentication and authorization procedure based on the NSSAA function.

The UE may also store the allowed NSSAI, the configured NSSAI, the rejected NSSAI, and the mapped S-NSSAI.

The UE may include information other than the 1st to 2nd identification information in the registration request message and/or the RRC message, and may include and transmit, for example, the UE ID and/or the PLMN ID and/or the AMF identification information.

In a case that the first base station apparatus receives an RRC message including the registration request message, the first base station apparatus selects the AMF to which the registration request message is transferred (S602). Note that the first base station apparatus can select the AMF, based on one or multiple pieces of identification information included in the registration request message and/or the RRC message. Specifically, in a case that the first base station apparatus receives the 1st to 2nd identification information, the first base station apparatus may select the AMF as a transmission destination of the registration request message, based on at least one piece of identification information out of the 1st to 2nd identification information.

For example, in a case that the first base station apparatus receives the 1st identification information, the first base station apparatus may select the AMF, based on the 1st identification information, regardless of whether or not the 2nd identification information is received. Specifically, the first base station apparatus may select the AMF included in the network slice identified by the 1st identification information, or the AMF having connectivity to the network slice identified by the 1st identification information.

In a case that the first base station apparatus does not receive the 1st identification information and receives the 2nd identification information, the first base station apparatus may transmit a control message indicating rejection of the request of the UE. In this case, the first base station apparatus need not select the AMF.

In a case that the first base station apparatus does not receive the 1st identification information and receives the 2nd identification information, the first base station apparatus may select the AMF without using the 2nd identification information. For example, the first base station apparatus may select a default AMF.

Note that the method of selecting the AMF is not limited thereto, and the first base station apparatus may select the AMF, based on a condition other than the above.

The first base station apparatus extracts the registration request message from the received RRC message and transfers the registration request message to the selected AMF (S604). Note that in a case that at least one piece of identification information of the 1st to 2nd identification information is not included in the registration request message but in the RRC message, the identification information included in the RRC message may be transferred to the selected AMF together with the registration request message (S604).

In a case that the AMF receives the registration request message, the AMF can perform the first condition fulfillment determination. The first condition fulfillment determination, a condition for performing the first condition fulfillment determination, and the like may be the same as those of section 3.3. The transmitted and/or received control message and the behavior of each apparatus in a case that the first condition fulfillment determination is true or false may be the same as those of section 3.3. Similarly to section 3.3, the first condition fulfillment determination may be performed by an NF other than the AMF, and in this case, transmission and/or reception of the control information between the AMF and the NF and the like may also be the same as those of section 3.3.

Note that, in addition to section 3.3, criteria for determining true or false of the first condition fulfillment determination may be enhanced as follows. For example, in a case that the AMF receives the registration request message including the 1st identification information and the 2nd identification information from the UE, the first condition fulfillment determination may be determined as true. In a case that the AMF receives the registration request message including the 1st identification information but not including the 2nd identification information from the UE, the first condition fulfillment determination may be determined as true. In a case that the AMF receives the registration request message not including the 1st identification information and including the 2nd identification information from the UE, the first condition fulfillment determination may be determined as false. In a case that the AMF receives the registration request message including neither the 1st identification information nor the 2nd identification information from the UE, the criteria for determining true or false of the first condition fulfillment determination may be the same as those of section 3.3.

The AMF may include one or more pieces of identification information out of the 10th to 13th and 15th identification information in a control message, and may transmit them. Here, the 10th to 13th and 15th identification information may be as described in section 2.6. Note that, by transmitting these pieces of identification information and/or the control message, the AMF may indicate that the network supports the functions, may indicate that the request from the UE is accepted, may indicate that the request from the UE is not allowed, or may indicate information obtained by combining the above-described pieces of information. Furthermore, in a case that multiple pieces of identification information are transmitted and/or received, two or more pieces of identification information of these pieces of identification information may be configured as one or more pieces of identification information. Note that information indicating support of each function and information indicating a request for use of each function may be transmitted and/or received as the same piece of identification information, or may be transmitted and/or received as different pieces of identification information.

In a case that the AMF receives at least any one of the 1st to 2nd identification information from the UE, and/or the configuration information of the UE is updated after the previous registration procedure, the AMF may transmit the 10th to 13th and 15th identification information in a control message.

Specifically, in a case that the AMF receives the registration request message including the 1st identification information and not including the 2nd identification information from the UE via the first base station apparatus, the AMF may transmit the registration accept message including the 10th to 13th identification information.

In a case that the AMF receives the registration request message including the 1st identification information and the 2nd identification information from the UE via the first base station apparatus, the AMF may transmit the registration accept message including the 10th to 13th and 15th identification information.

In a case that the AMF receives the registration request message not including the 1st identification information and including the 2nd identification information from the UE via the first base station apparatus, the AMF may transmit the registration reject message including the 10th to 13th and 15th identification information.

Note that, in a case that the AMF receives the registration request message from the UE via the first base station apparatus, the AMF may transmit the registration accept message or the registration reject message including the 10th to 13th and 15th identification information, regardless of whether or not the registration request message includes the 1st identification information and/or the 2nd identification information.

The AMF may further include the configured NSSAI, and/or the allowed NSSAI, and/or the rejected NSSAI, and/or the pending NSSAI in the control message for transmission. Note that the 10th to 13th and 15th identification information may be transmitted in the allowed NSSAI, and/or the rejected NSSAI, and/or the pending NSSAI, or may be transmitted as information different from these.

In a case that the AMF is scheduled to perform the NSSAA procedure after completion of the present procedure or in parallel with the present procedure although there is no S-NSSAI (allowed NSSAI) allowed for the UE at the time of transmission of the control message, or the AMF is in the middle of performing the NSSAA procedure between the UE and the network, or the AMF includes the pending NSSAI in the control message for transmission, the AMF may include an empty value in the allowed NSSAI for transmission.

Note that the AMF may select or determine at least which piece of identification information out of the 10th to 13th and 15th identification information is to be included in the control message, based on each piece of received identification information, and/or subscriber information, and/or capability information of the network, and/or an operator policy, and/or a state of the network, and/or registration information of a user, and/or a context stored in the AMF, and/or the like.

By transmitting the registration accept message based on each piece of received identification information, and/or subscriber information, and/or capability information of the network, and/or the operator policy, and/or the state of the network, and/or the registration information of the user, and/or the context stored in the AMF, and/or the like, the AMF may indicate that the request from the UE is accepted, or by transmitting the registration reject message, the AMF may indicate that the request from the UE is rejected.

The UE receives a control message (the registration accept message or the registration reject message) and/or the 10th to 13th and 15th identification information via the first base station apparatus (S610). In a case that the control message is the registration accept message, then by receiving the registration accept message, the UE can recognize that the request from the UE on the registration request message is accepted, and recognize details of various pieces of identification information included in the registration accept message. In a case that the control message is the registration reject message, the UE can recognize that the request from the UE using the registration request message has been rejected and the details of various kinds of identification information included in the registration reject message by receiving the registration reject message.

Based on reception of the 10th identification information or a control message including the 10th identification information, the UE may recognize the first frequency band supported by the first base station apparatus and not supported by the second base station apparatus.

Based on reception of the 11th identification information or a control message including the 11th identification information, the UE may recognize the first S-NSSAI corresponding to the first frequency band.

Based on reception of the 12th identification information or a control message including the 12th identification information, the UE may recognize the second frequency band not supported by the first base station apparatus and supported by the second base station apparatus.

Based on reception of the 13th identification information or a control message including the 13th identification information, the UE may recognize the second S-NSSAI corresponding to the second frequency band.

Based on reception of the 10th identification information, and/or the 11th identification information, and/or a control message including the 10th and/or 11th identification information, the UE may determine that the UE can transmit a control message (for example, a registration request message, and/or a PDU session establishment request message, and/or an N1 SM container, and/or an NAS message) including the 1st identification information to the first base station apparatus.

In a case that the UE reselects the cell of the second base station apparatus and reselects the cell of the first base station apparatus again within a prescribed period based on reception of the 10th identification information, and/or the 11th identification information, and/or a control message including the 10th and/or 11th identification information, the UE may determine that the UE can transmit a control message (for example, a registration request message, and/or a PDU session establishment request message, and/or an N1 SM container, and/or an NAS message) including the 1st identification information to the first base station apparatus.

In a case that the UE reselects the cell of the second base station apparatus based on reception of the 10th identification information, and/or the 11th identification information, and/or a control message including the 10th and/or 11th identification information, the UE may determine that the UE cannot transmit a control message (for example, a registration request message, and/or a PDU session establishment request message, and/or an N1 SM container, and/or an NAS message) including the 1st identification information to the second base station apparatus.

Based on reception of the 12th identification information, and/or the 13th identification information, and/or a control message including the 12th and/or 13th identification information, the UE may determine that the UE cannot transmit a control message (for example, a registration request message, and/or a PDU session establishment request message, and/or an N1 SM container, and/or an NAS message) including the 2nd identification information to the first base station apparatus.

In a case that the UE reselects the cell of the second base station apparatus based on reception of the 12th identification information, and/or the 13th identification information, and/or a control message including the 12th and/or 13th identification information, the UE may determine that the UE can transmit a control message (for example, a registration request message, and/or a PDU session establishment request message, and/or an N1 SM container, and/or an NAS message) including the 2nd identification information to the second base station apparatus.

In a case that the UE transmits the registration request message including the 2nd identification information to the AMF, based on reception of at least one piece of identification information out of the 12th to 13th and 15th identification information or a control message including at least one piece of identification information out of the 12th to 13th and 15th identification information, the UE may recognize that the 2nd identification information has been rejected.

In a case that the UE transmits the registration request message including the 2nd identification information to the AMF, based on reception of at least one piece of identification information out of the 12th to 13th and 15th identification information or a control message including at least one piece of identification information out of the 12th to 13th and 15th identification information, the UE may determine that the UE cannot transmit a control message (for example, a registration request message, and/or a PDU session establishment request message, and/or an N1 SM container, and/or an NAS message) including the 2nd identification information to the first base station apparatus.

In a case that the UE transmits the registration request message including the 2nd identification information to the AMF, based on reception of at least one piece of identification information out of the 12th to 13th and 15th identification information or a control message including at least one of the 12th to 13th and 15th identification information, the UE may perform cell reselection, and/or PLMN selection, and/or access network selection.

In a case that the UE transmits the registration request message including the 2nd identification information to the AMF, in a case that the UE reselects the cell of the second base station apparatus based on reception of at least one piece of identification information out of the 12th to 13th and 15th identification information or a control message including at least one of the 12th to 13th and 15th identification information, the UE may determine that the UE can transmit a control message (for example, a registration request message, and/or a PDU session establishment request message, and/or an N1 SM container, and/or an NAS message) including the 2nd identification information to the second base station apparatus.

Note that the UE may additionally acquire the 10th to 13th identification information in the present procedure after the UE acquires the 10th to 13th identification information by performing the procedures from section 3.2 to section 3.7 one or more times. In this case, the UE may update information related to the 10th to 13th identification information to the details acquired in the present procedure.

Further, in a case that the control message is the registration accept message, the UE can transmit a registration complete message to the AMF via the first base station apparatus as a response message to the registration accept message (S612). Here, the registration complete message may be transmitted and/or received in an RRC message between the UE and the first base station apparatus.

The AMF receives the registration complete message via the first base station apparatus (S612). Each apparatus completes the present procedure based on transmission and/or reception of the registration accept message and/or the registration complete message.

Each apparatus may complete the registration procedure based on the transmission and/or reception of the registration reject message.

Note that each apparatus may transition to or maintain a state in which the UE is registered with the network (an RM_REGISTERED state or a 5GMM-REGISTERED state) based on the transmission and/or reception of the registration accept message and/or the registration complete message or may transition to or maintain a state in which the UE is not registered with the network (an RM_DEREGISTERED state or a 5GMM-DEREGISTERED state) over the access in which the UE has received the registration reject message for the current PLMN based on the transmission and/or reception of the registration reject message. Also, the transition of each apparatus to each state may be performed based on reception of the registration complete message or completion of the registration procedure.

In addition, each apparatus may perform processing based on information transmitted and/or received in the registration procedure based on completion of the registration procedure. For example, in a case that information indicating that a part of the request from the UE is rejected is transmitted and/or received, a reason of rejection of the request from the UE may be recognized. In addition, each apparatus may perform the present procedure again or may perform the registration procedure on the core network_A or another cell based on the cause for the rejection of the request from the UE.

Moreover, the UE may store the identification information received along with the registration accept message and/or the registration reject message or may recognize determination of the network, based on the completion of the registration procedure.

Note that the registration procedure described in the present section may be the registration procedure for initial registration, or may be the registration procedure for mobility and periodic registration.

3.5. Registration Procedure Via Second Base Station Apparatus

Next, a behavior of each apparatus of a case that the UE that has acquired at least one of the 10th to 13th identification information by performing the procedure of section 3.2 and/or section 3.3 performs the registration procedure via the second base station apparatus in a case of reselecting the cell of the second base station apparatus will be described with reference to FIG. 6. A behavior of each apparatus of a case that the UE that has not acquired the 10th to 13th identification information although the UE has performed the procedure of section 3.2 and/or section 3.3 or because the UE does not perform the procedure of section 3.2 and/or section 3.3 performs the registration procedure via the second base station apparatus in a case of reselecting the cell of the second base station apparatus will be described as well. In the present section, the registration procedure via the second base station apparatus may be simply referred to as the present procedure or the registration procedure.

Note that the present procedure may be performed after the procedures from section 3.4 to section 3.7 are performed one or more times.

The UE may initiate the present procedure on the same condition as that of section 3.3. Each apparatus (in particular, the UE and the AMF) can transition to the registered state (5GMM-REGISTEDED state), based on completion of the registration procedure. Note that each registered state may be managed by each apparatus for each access. Specifically, each apparatus may independently manage the registration state (registered state or deregistered state) for the 3GPP access and the registration state for the non-3GPP access.

In addition, the registration procedure may be a procedure for updating position registration information of the UE in the network, and/or periodically giving a notification of the state of the UE from the UE to the network, and/or updating a specific parameter related to the UE in the network.

The procedure for the UE to transition from the state (deregistered state) of not registered with the network to the state (registered state) of being registered therewith and the registration procedure performed in the state (registered state) in which the UE is registered with the network may be the same as those of section 3.3.

In the following, description is given assuming a state in which the UE has selected the cell of the second base station apparatus.

First, the UE transmits the registration request message to the AMF (S600) (S602) and (S604), and thereby initiates the registration procedure. Specifically, the UE transmits an RRC message including the registration request message to the second base station apparatus (also referred to as a 5G AN or a gNB) (S600).

Here, the UE can transmit at least one of the 1st to 2nd identification information in the registration request message and/or the RRC message. Here, the 1st to 2nd identification information may be as described in section 2.6. In addition, the UE may transmit identification information indicating a type of the present procedure and/or capability information of the UE in the registration request message and/or the RRC message. Here, the identification information indicating a type of the present procedure and the capability information of the UE may be the same as those of section 3.3.

The UE may transmit these pieces of identification information in a control message different from these, for example, a control message of a layer (for example, a MAC layer, an RLC layer, a PDCP layer, an SDAP layer, or the like) lower than the RRC layer. Note that, by transmitting these pieces of identification information, the UE may indicate that the UE supports each function, may indicate a request of the UE, or may indicate both of these. Furthermore, in a case that multiple pieces of identification information are transmitted and/or received, two or more pieces of identification information of these pieces of identification information may be configured as one or more pieces of identification information.

Note that the UE may determine whether to transmit which of the 1st to 2nd identification information to the network based on the UE capability information, and/or the UE policy, and/or the UE state, and/or the user registration information, and/or a context stored in the UE, and/or the like.

In particular, in a case that the UE has not acquired the 10th to 13th identification information, the UE may determine whether to transmit the 1st to 2nd identification information to the network, based on the above.

For example, in a case that the UE has not acquired the 10th to 13th identification information, in the present procedure, the UE may transmit the 1st to 2nd identification information to the second base station apparatus.

In other words, in a case that the UE does not determine that the UE cannot transmit a control message including the 1st identification information to the second base station apparatus, or the UE does not determine that the UE can transmit a control message including the 2nd identification information to the second base station apparatus in the procedure of section 3.2 and/or section 3.3 and/or section 3.4, in the present procedure, the UE may transmit the registration request message and/or the RRC message including the 1st identification information and/or the 2nd identification information to the second base station apparatus.

In a case that the UE has already acquired at least one of the 10th to 13th identification information, the UE may determine whether to transmit the 1st to 2nd identification information to the network, in consideration of not only the above but also the acquired identification information.

For example, in a case that the UE has already acquired at least one of the 10th to 13th identification information, the UE may transmit the 2nd identification information and may not transmit the 1st identification information to the second base station apparatus, based on the acquired identification information.

In other words, in a case that the UE determines that the UE can transmit a control message including the 2nd identification information to the second base station apparatus in the procedure of section 3.2 and/or section 3.3 and/or section 3.4, in the present procedure, the UE may transmit the registration request message and/or the RRC message including the 2nd identification information to the second base station apparatus.

In a case that the UE determines that the UE cannot transmit a control message including the 1st identification information to the second base station apparatus in the procedure of section 3.2 and/or section 3.3 and/or section 3.4, in the present procedure, the UE need not transmit the registration request message and/or the RRC message including the 1st identification information to the second base station apparatus.

Further, in a case that the UE includes the NSSAA function, or requests at least one S-NSSAI for identifying a slice that requires NSSAA, the UE may include in the registration request message as the capability information for transmission. By transmitting the capability information, the UE may request the network to treat the UE as a UE with the NSSAA function, and to perform, in the procedure related to the UE, an authentication and authorization procedure based on the NSSAA function.

The UE may also store the allowed NSSAI, the configured NSSAI, the rejected NSSAI, and the mapped S-NSSAI.

The UE may include information other than the 1st to 2nd identification information in the registration request message and/or the RRC message, and may include and transmit, for example, the UE ID and/or the PLMN ID and/or the AMF identification information.

In a case that the second base station apparatus receives an RRC message including the registration request message, the second base station apparatus selects the AMF to which the registration request message is transferred (S602). Note that the second base station apparatus can select the AMF, based on one or multiple pieces of identification information included in the registration request message and/or the RRC message. Specifically, in a case that the second base station apparatus receives the 1st to 2nd identification information, the second base station apparatus may select the AMF as a transmission destination of the registration request message, based on at least one piece of identification information out of the 1st to 2nd identification information.

For example, in a case that the second base station apparatus receives the 2nd identification information, the second base station apparatus may select the AMF, based on the 2nd identification information, regardless of whether or not the 1st identification information is received. Specifically, the second base station apparatus may select the AMF included in the network slice identified by the 2nd identification information, or the AMF having connectivity to the network slice identified by the 2nd identification information.

In a case that the second base station apparatus does not receive the 2nd identification information and receives the 1st identification information, the second base station apparatus may transmit a control message indicating rejection of the request of the UE. In this case, the second base station apparatus need not select the AMF.

In a case that the first base station apparatus does not receive the 2nd identification information and receives the 1st identification information, the first base station apparatus may select the AMF without using the 2nd identification information. For example, the second base station apparatus may select a default AMF.

Note that the method of selecting the AMF is not limited thereto, and the second base station apparatus may select the AMF, based on a condition other than the above.

The second base station apparatus extracts the registration request message from the received RRC message, and transfers the registration request message to the selected AMF (S604). Note that in a case that at least one piece of identification information of the 1st to 2nd identification information is not included in the registration request message but in the RRC message, the identification information included in the RRC message may be transferred to the selected AMF together with the registration request message (S604).

In a case that the AMF receives the registration request message, the AMF can perform the first condition fulfillment determination. The first condition fulfillment determination, a condition for performing the first condition fulfillment determination, and the like may be the same as those of section 3.3. The transmitted and/or received control message and the behavior of each apparatus in a case that the first condition fulfillment determination is true or false may be the same as those of section 3.3. Similarly to section 3.3, the first condition fulfillment determination may be performed by an NF other than the AMF, and in this case, transmission and/or reception of the control information between the AMF and the NF and the like may also be the same as those of section 3.3.

Note that, in addition to section 3.3, criteria for determining true or false of the first condition fulfillment determination may be enhanced as follows. For example, in a case that the AMF receives the registration request message including the 1st identification information and the 2nd identification information from the UE, the first condition fulfillment determination may be determined as true. In a case that the AMF receives the registration request message including the 1st identification information but not including the 2nd identification information from the UE, the first condition fulfillment determination may be determined as false. In a case that the AMF receives the registration request message not including the 1st identification information and including the 2nd identification information from the UE, the first condition fulfillment determination may be determined as true. In a case that the AMF receives the registration request message including neither the 1st identification information nor the 2nd identification information from the UE, the criteria for determining true or false of the first condition fulfillment determination may be the same as those of section 3.3.

The AMF may transmit one or more pieces of identification information out of the 10th to 13th and 16th identification information in a control message. Here, the 10th to 13th and 16th identification information may be as described in section 2.6. Note that, by transmitting these pieces of identification information and/or the control message, the AMF may indicate that the network supports the functions, may indicate that the request from the UE is accepted, may indicate that the request from the UE is not allowed, or may indicate information obtained by combining the above-described pieces of information. Furthermore, in a case that multiple pieces of identification information are transmitted and/or received, two or more pieces of identification information of these pieces of identification information may be configured as one or more pieces of identification information. Note that information indicating support of each function and information indicating a request for use of each function may be transmitted and/or received as the same piece of identification information, or may be transmitted and/or received as different pieces of identification information.

In a case that the AMF receives at least any one of the 1st to 2nd identification information from the UE, and/or the configuration information of the UE is updated after the previous registration procedure, the AMF may transmit the 10th to 13th and 16th identification information in a control message.

Specifically, in a case that the AMF receives the registration request message including the 2nd identification information and not including the 1st identification information from the UE via the second base station apparatus, the AMF may transmit the registration accept message including the 10th to 13th identification information.

In a case that the AMF receives the registration request message including the 1st identification information and the 2nd identification information from the UE via the second base station apparatus, the AMF may transmit the registration accept message including the 10th to 13th and 16th identification information.

In a case that the AMF receives the registration request message not including the 2nd identification information and including the 1 st identification information from the UE via the second base station apparatus, the AMF may transmit the registration reject message including the 10th to 13th and 16th identification information.

Note that, in a case that the AMF receives the registration request message from the UE via the second base station apparatus, the AMF may transmit the registration accept message or the registration reject message including the 10th to 13th and 16th identification information, regardless of whether or not the registration request message includes the 1st identification information and/or the 2nd identification information.

The AMF may further include the configured NSSAI, and/or the allowed NSSAI, and/or the rejected NSSAI, and/or the pending NSSAI in the control message for transmission. Note that the 10th to 13th and 16th identification information may be transmitted in the allowed NSSAI, and/or the rejected NSSAI, and/or the pending NSSAI, or may be transmitted as information different from these.

In a case that the AMF is scheduled to perform the NSSAA procedure after completion of the present procedure or in parallel with the present procedure although there is no S-NSSAI (allowed NSSAI) allowed for the UE at the time of transmission of the control message, or the AMF is in the middle of performing the NSSAA procedure between the UE and the network, or the AMF includes the pending NSSAI in the control message for transmission, the AMF may include an empty value in the allowed NSSAI for transmission.

Note that the AMF may select or determine at least which piece of identification information out of the 10th to 13th and 16th identification information is to be included in the control message, based on each piece of received identification information, and/or subscriber information, and/or capability information of the network, and/or an operator policy, and/or a state of the network, and/or registration information of a user, and/or a context stored in the AMF, and/or the like.

By transmitting the registration accept message based on each piece of received identification information, and/or subscriber information, and/or capability information of the network, and/or the operator policy, and/or the state of the network, and/or the registration information of the user, and/or the context stored in the AMF, and/or the like, the AMF may indicate that the request from the UE is accepted, or by transmitting the registration reject message, the AMF may indicate that the request from the UE is rejected.

The UE receives a control message (the registration accept message or the registration reject message) and/or the 10th to 13th and 16th identification information via the second base station apparatus (S610). In a case that the control message is the registration accept message, then by receiving the registration accept message, the UE can recognize that the request from the UE on the registration request message is accepted, and recognize details of various pieces of identification information included in the registration accept message. In a case that the control message is the registration reject message, the UE can recognize that the request from the UE using the registration request message has been rejected and the details of various kinds of identification information included in the registration reject message by receiving the registration reject message.

Based on reception of the 10th identification information or a control message including the 10th identification information, the UE may recognize the first frequency band supported by the first base station apparatus and not supported by the second base station apparatus.

Based on reception of the 11th identification information or a control message including the 11th identification information, the UE may recognize the first S-NSSAI corresponding to the first frequency band.

Based on reception of the 12th identification information or a control message including the 12th identification information, the UE may recognize the second frequency band not supported by the first base station apparatus and supported by the second base station apparatus.

Based on reception of the 13th identification information or a control message including the 13th identification information, the UE may recognize the second S-NSSAI corresponding to the second frequency band.

In a case that the UE reselects the cell of the first base station apparatus based on reception of the 10th identification information, and/or the 11th identification information, and/or a control message including the 10th and/or 11th identification information, the UE may determine that the UE can transmit a control message (for example, a registration request message, and/or a PDU session establishment request message, and/or an N1 SM container, and/or an NAS message) including the 1st identification information to the first base station apparatus.

Based on reception of the 10th identification information, and/or the 11th identification information, and/or a control message including the 10th and/or 11th identification information, the UE may determine that the UE cannot transmit a control message (for example, a registration request message, and/or a PDU session establishment request message, and/or an N1 SM container, and/or an NAS message) including the 1st identification information to the second base station apparatus.

In a case that the UE reselects the cell of the first base station apparatus based on reception of the 12th identification information, and/or the 13th identification information, and/or a control message including the 12th and/or 13th identification information, the UE may determine that the UE cannot transmit a control message (for example, a registration request message, and/or a PDU session establishment request message, and/or an N1 SM container, and/or an NAS message) including the 2nd identification information to the first base station apparatus.

Based on reception of the 12th identification information, and/or the 13th identification information, and/or a control message including the 12th and/or 13th identification information, the UE may determine that the UE can transmit a control message (for example, a registration request message, and/or a PDU session establishment request message, and/or an N1 SM container, and/or an NAS message) including the 2nd identification information to the second base station apparatus.

In a case that the UE reselects the cell of the first base station apparatus and reselects the cell of the second base station apparatus again within a prescribed period based on reception of the 12th identification information, and/or the 13th identification information, and/or a control message including the 12th and/or 13th identification information, the UE may determine that the UE can transmit a control message (for example, a registration request message, and/or a PDU session establishment request message, and/or an N1 SM container, and/or an NAS message) including the 2nd identification information to the second base station apparatus.

In a case that the UE transmits the registration request message including the 1st identification information to the AMF, based on reception of at least one piece of identification information out of the 10th to 11th and 16th identification information or a control message including at least one of the 10th to 11th and 16th identification information, the UE may determine that the 1st identification information has been rejected.

In a case that the UE transmits the registration request message including the 1st identification information to the AMF, based on reception of at least one piece of identification information out of the 10th to 11th and 16th identification information or a control message including at least one of the 10th to 11th and 16th identification information, the UE may determine that the UE cannot transmit a control message (for example, a registration request message, and/or a PDU session establishment request message, and/or an N1 SM container, and/or an NAS message) including the 1st identification information to the second base station apparatus.

In a case that the UE transmits the registration request message including the 1 st identification information to the AMF, based on reception of at least one piece of identification information out of the 10th to 11th and 16th identification information or a control message including at least one of the 10th to 11th and 16th identification information, the UE may perform cell reselection, and/or PLMN selection, and/or access network selection.

In a case that the UE transmits the registration request message including the 1st identification information to the AMF, in a case that the UE reselects the cell of the first base station apparatus based on reception of at least one piece of identification information out of the 10th to 11th and 16th identification information or a control message including at least one of the 10th to 11th and 16th identification information, the UE may determine that the UE can transmit a control message (for example, a registration request message, and/or a PDU session establishment request message, and/or an N1 SM container, and/or an NAS message) including the 1st identification information to the first base station apparatus.

Note that the UE may additionally acquire the 10th to 13th identification information in the present procedure after the UE acquires the 10th to 13th identification information by performing the procedures from section 3.2 to section 3.7 one or more times. In this case, the UE may update information related to the 10th to 13th identification information to the details acquired in the present procedure.

Further, in a case that the control message is the registration accept message, the UE can transmit a registration complete message to the AMF via the second base station apparatus as a response message to the registration accept message (S612). Here, the registration complete message may be transmitted and/or received in an RRC message between the UE and the second base station apparatus.

The AMF receives the registration complete message via the second base station apparatus (S612). Each apparatus completes the present procedure based on transmission and/or reception of the registration accept message and/or the registration complete message.

Each apparatus may complete the registration procedure based on the transmission and/or reception of the registration reject message.

Note that each apparatus may transition to or maintain a state in which the UE is registered with the network (an RM_REGISTERED state or a 5GMM-REGISTERED state) based on the transmission and/or reception of the registration accept message and/or the registration complete message or may transition to or maintain a state in which the UE is not registered with the network (an RM_DEREGISTERED state or a 5GMM-DEREGISTERED state) over the access in which the UE has received the registration reject message for the current PLMN based on the transmission and/or reception of the registration reject message. Also, the transition of each apparatus to each state may be performed based on reception of the registration complete message or completion of the registration procedure.

In addition, each apparatus may perform processing based on information transmitted and/or received in the registration procedure based on completion of the registration procedure. For example, in a case that information indicating that a part of the request from the UE is rejected is transmitted and/or received, a reason of rejection of the request from the UE may be recognized. In addition, each apparatus may perform the present procedure again or may perform the registration procedure on the core network_A or another cell based on the cause for the rejection of the request from the UE.

Moreover, the UE may store the identification information received along with the registration accept message and/or the registration reject message or may recognize determination of the network, based on the completion of the registration procedure.

Note that the registration procedure described in the present section may be the registration procedure for initial registration, or may be the registration procedure for mobility and periodic registration.

3.6. PDU Session Establishment Procedure Via First Base Station Apparatus

Figure 7:
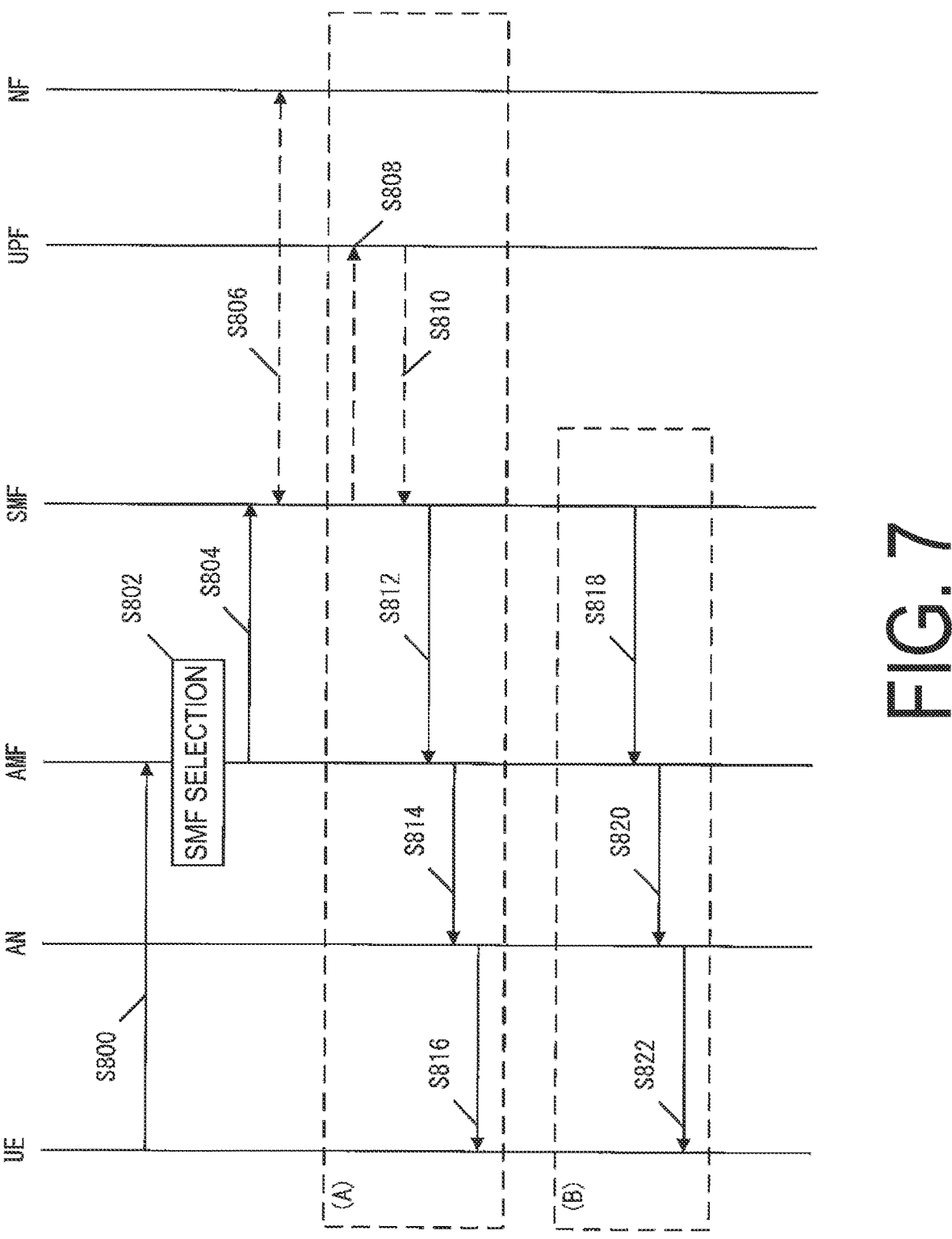
FIG. 7 is a diagram illustrating a PDU session establishment procedure.

Next, a behavior of each apparatus of a case that the UE that has acquired at least one of the 10th to 13th identification information by performing the procedure of section 3.2 and/or section 3.3 and/or section 3.4 and/or section 3.5 performs the PDU session establishment procedure via the first base station apparatus will be described with reference to FIG. 7. A behavior of each apparatus of a case that the UE that has not acquired the 10th to 13th identification information although the UE has performed the procedure of section 3.2 and/or section 3.3 and/or section 3.4 and/or section 3.5 or because the UE does not perform the procedure of section 3.2 and/or section 3.3 and/or section 3.4 and/or section 3.5 performs the PDU session establishment procedure via the first base station apparatus will be described as well. In the present section, the PDU session establishment procedure via the first base station apparatus may be simply referred to as the present procedure or the PDU session establishment procedure.

Note that the present procedure may be performed after the procedures from section 3.4 to section 3.7 are performed one or more times.

As described above, the following description is given assuming a state in which the UE selects the cell of the first base station apparatus.

First, by transmitting the NAS message including an N1 SM container including the PDU session establishment request message to the AMF via the access network (S800), the UE initiates the PDU session establishment procedure. The NAS message may be, for example, a message transmitted via the N1 interface, and may be an uplink NAS transport (UL NAS TRANSPORT) message.

Here, the access network is the 3GPP access or the non-3GPP access, and may include the first base station apparatus. In other words, the UE transmits the NAS message to the AMF via the first base station apparatus.

The UE can notify the network side of what is requested by the UE by including at least one piece out of the 1st to 3rd identification information in the PDU session establishment request message, and/or the N1 SM container, and/or the NAS message for transmission. Here, the 1st to 3rd identification information may be as described in section 2.6.

Note that the UE may determine whether to transmit which of 1st to 3rd identification information to the network based on the UE capability information, and/or the UE policy, and/or the UE state, and/or the user registration information, and/or a context stored in the UE, and/or the like.

In particular, in a case that the UE has not acquired the 10th to 13th identification information, the UE may determine whether to transmit the 1st to 3rd identification information to the network, based on the above.

For example, in a case that the UE has not acquired the 10th to 13th identification information, in the present procedure, the UE may transmit the 1st to 3rd identification information via the first base station apparatus.

In other words, in a case that the UE does not determine that the UE can transmit a control message including the 1st identification information to the first base station apparatus, or the UE does not determine that the UE cannot transmit a control message including the 2nd identification information to the first base station apparatus in the procedure of section 3.2 and/or section 3.3 and/or section 3.4 and/or section 3.5, in the present procedure, the UE may transmit the PDU session establishment request message, and/or the N1 SM container, and/or the NAS message including the 1st identification information and/or the 2nd identification information and/or the 3rd identification information via the first base station apparatus.

In a case that the UE has already acquired at least one of the 10th to 13th identification information, the UE may determine whether to transmit the 1st to 3rd identification information to the network, in consideration of not only the above but also the acquired identification information.

For example, in a case that the UE has already acquired at least one of the 10th to 13th identification information, the UE may transmit the 1st identification information and the 3rd identification information and may not transmit the 2nd identification information via the first base station apparatus, based on the acquired identification information.

In other words, in a case that the UE determines that the UE can transmit a control message including the 1st identification information to the first base station apparatus in the procedure of section 3.2 and/or section 3.3 and/or section 3.4 and/or section 3.5, in the present procedure, the UE may transmit the PDU session establishment request message, and/or the N1 SM container, and/or the NAS message including the 1 st identification information and the 3rd identification information via the first base station apparatus.

In a case that the UE determines that the UE cannot transmit a control message including the 2nd identification information to the first base station apparatus in the procedure of section 3.2 and/or section 3.3 and/or section 3.4 and/or section 3.5, in the present procedure, the UE need not transmit the PDU session establishment request message, and/or the N1 SM container, and/or the NAS message including the 2nd identification information via the first base station apparatus.

Note that the UE may transmit these pieces of identification information in a control message different from these, for example, a control message of a layer (for example, an RRC layer, a MAC layer, an RLC layer, a PDCP layer, an SDAP layer, or the like) lower than the NAS layer, or a control message of a layer (for example, a transport layer, a session layer, a presentation layer, an application layer, or the like) higher than the NAS layer.

Next, in a case that the AMF receives the NAS message, the AMF can recognize what is requested by the UE, and/or details of information and the like (a message, a container, information) included in the NAS message.

Next, the AMF selects the SMF as a transfer destination of at least a part of the information and the like (a message, a container, information) included in the NAS message received from the UE (S802). Note that the AMF may select the SMF being a transfer destination, based on the information and the like (a message, a container, information) included in the NAS message, and/or the subscriber information, and/or the capability information of the network, and/or the UE policy, and/or the operator policy, and/or the state of the network, and/or the registration information of the user, and/or the context stored by the AMF, and/or the like.

Next, the AMF transmits at least a part of the information and the like (a message, a container, information) included in the NAS message received from the UE to the selected SMF via the N11 interface, for example (S804).

Next, in a case that the SMF receives information and the like (a message, a container, information) transmitted from the AMF, the SMF can recognize what is requested by the UE, and/or details of the information and the like (a message, a container, information) received from the AMF.

Here, the SMF may perform the second condition fulfillment determination. The second condition fulfillment determination may be for determining whether or not the network accepts the request of the UE. In a case that the SMF determines that the second condition fulfillment determination is true, the SMF may initiate the procedure of (A) of FIG. 7, whereas in a case that the SMF determines that the second condition fulfillment determination is false, the SMF may initiate the procedure of (B) of FIG. 7.

Note that the second condition fulfillment determination may be performed by an NF other than the SMF. The NF may be, for example, an NSSF, an NWDAF, a PCF, or an NRF. In a case that the NF other than the SMF performs the second condition fulfillment determination, the SMF may provide the NF with at least a part of information necessary for performing the second condition fulfillment determination, specifically, information received from the UE (S806). Then, in a case that the NF determines true or false of the second condition fulfillment determination based on the information received from the SMF, the NF may notify the SMF of information including results (in other words, true or false) of the second condition fulfillment determination. The SMF may determine the identification information and/or the control message to be transmitted to the UE, based on the results of the second condition fulfillment determination received from the NF.

Note that the second condition fulfillment determination may be performed based on the information and the like (a message, a container, information) received from the AMF, and/or the subscriber information (subscription information), and/or the capability information of the network, and/or the UE policy, and/or the operator policy, and/or the state of the network, and/or the registration information of the user, and/or the context stored by the SMF, and/or the like.

For example, in a case that the network allows the request of the UE, the second condition fulfillment determination may be determined as true, whereas in a case that the network does not allow the request of the UE, the second condition fulfillment determination may be determined as false. In a case that a network as a connection destination of the UE and/or an apparatus in the network supports the function requested by the UE, the second condition fulfillment determination may be determined as true, whereas in a case that the network and/or the apparatus does not support the function requested by the UE, the second condition fulfillment determination may be determined as false. In a case that the transmitted and/or received identification information is allowed, the second condition fulfillment determination may be determined as true, whereas in a case that the transmitted and/or received identification information is not allowed, the second condition fulfillment determination may be determined as false.

In a case that the SMF receives a control message (the PDU session establishment request message and/or the N1 SM container and/or the NAS message) including neither the 1st identification information nor the 2nd identification information from the UE, true or false of the first condition fulfillment determination may be determined based on the above. In a case that the SMF receives a control message (the PDU session establishment request message and/or the N1 SM container and/or the NAS message) including the 1st identification information and the 2nd identification information from the UE, the second condition fulfillment determination may be determined as true. In a case that the SMF receives a control message (the PDU session establishment request message and/or the N1 SM container and/or the NAS message) including the 1st identification information and not including the 2nd identification information from the UE, the second condition fulfillment determination may be determined as true. In a case that the SMF receives a control message (the PDU session establishment request message and/or the N1 SM container and/or the NAS message) not including the 1st identification information and including the 2nd identification information from the UE, the second condition fulfillment determination may be determined as false.

Note that the condition for determining true or false of the second condition fulfillment determination need not necessarily be limited to the condition described above.

Next, each step of the procedure of (A) of FIG. 7 will be described.

Next, the SMF may select the UPF for a PDU session to be established, and transmit an N4 session establishment request message to the selected UPF via the N4 interface, for example (S808). The N4 session establishment request message may include at least a part of a PCC rule received from the PCF.

Here, the SMF may select one or more UPFs, based on the information and the like (a message, a container, information) received from the AMF, and/or the information such as the PCC rule received from the PCF, and/or the subscriber information, and/or the capability information of the network, and/or the UE policy, and/or the operator policy, and/or the state of the network, and/or the registration information of the user, and/or the context stored by the SMF, and/or the like. In a case that multiple UPFs are selected, the SMF may transmit the N4 session establishment request message to each UPF. The description below assumes that UPF_230 is selected.

Next, in a case that the UPF receives the N4 session establishment request message (S808), the UPF can recognize details of the information received from the SMF. The UPF may transmit an N4 session establishment response message to the SMF via the N4 interface, for example, based on reception of the N4 session establishment request message (S810).

Next, in a case that the SMF receives the N4 session establishment response message as a response message to the N4 session establishment request message, the SMF can recognize details of the information received from the UPF.

Next, the SMF transmits the N1 SM container, and/or N2 SM information, and/or the PDU session ID to the AMF via the N11 interface, for example, based on reception of the PDU session establishment request message, and/or selection of the UPF, and/or reception of the N4 session establishment response message, and/or the like (S812). Here, the N1 SM container may include the PDU session establishment accept message.

Next, the AMF that has received the N1 SM container, and/or the N2 SM information, and/or the PDU session ID transmits the NAS message to the UE via the first base station apparatus included in the access network (S814) (S816). Here, the NAS message is transmitted via the N1 interface, for example. The NAS message may be a downlink NAS transport (DL NAS TRANSPORT) message.

Specifically, in a case that the AMF transmits an N2 PDU session request message to the first base station apparatus included in the access network (S814), the first base station apparatus that has received the N2 PDU session request message transmits the NAS message to the UE (S816). Here, the N2 PDU session request message may include the NAS message and/or the N2 SM information. The NAS message may include the PDU session ID and/or the N1 SM container.

The PDU session establishment accept message may be a response message to the PDU session establishment request. The PDU session establishment accept message may indicate that establishment of the PDU session has been accepted.

Here, by transmitting the PDU session establishment accept message, and/or the N1 SM container, and/or the PDU session ID, and/or the NAS message, and/or the N2 SM information, and/or the N2 PDU session request message, the SMF and/or the AMF may indicate that at least a part of the request of the UE by the PDU session establishment request message has been accepted.

Here, the SMF and/or the AMF may include at least one piece out of the 10th to 15th identification information in the PDU session establishment accept message, and/or the N1 SM container, and/or the NAS message, and/or the N2 SM information, and/or the N2 PDU session request message for transmission. Here, the 10th to 15th identification information may be as described in section 2.6.

Note that, by transmitting these pieces of identification information and/or the PDU session establishment accept message, the SMF may indicate that the network supports each function, may indicate that the request of the UE has been accepted, may indicate that the request from the UE is not allowed, or may indicate information of a combination of these. Furthermore, in a case that multiple pieces of identification information are transmitted and/or received, two or more pieces of identification information of these pieces of identification information may be configured as one or more pieces of identification information. Note that information indicating support of each function and information indicating a request for use of each function may be transmitted and/or received as the same piece of identification information, or may be transmitted and/or received as different pieces of identification information.

In a case that the SMF receives at least one piece out of the 1 st to 3rd identification information from the UE, the SMF may include at least one piece of identification information out of the 10th to 15th identification information in the PDU session establishment accept message for transmission.

Specifically, in a case that the SMF receives the PDU session establishment request message including the 1st identification information and not including the 2nd identification information from the UE via the first base station apparatus and the AMF, the SMF may transmit the PDU session establishment accept message including the 10th to 13th and 15th identification information.

In a case that the SMF receives the PDU session establishment request message including the 1 st identification information and the 2nd identification information from the UE via the first base station apparatus and the AMF, the SMF may transmit the PDU session establishment accept message including the 10th to 13th and 15th identification information.

Note that, in a case that the SMF receives the PDU session establishment request message from the UE via the first base station apparatus and the AMF, the SMF may transmit the PDU session establishment accept message including the 10th to 13th and 15th identification information, regardless of whether or not the PDU session establishment request message includes the 1st identification information and/or the 2nd identification information.

The SMF may include the configured NSSAI, and/or the allowed NSSAI, and/or the rejected NSSAI, and/or the pending NSSAI in the PDU session establishment accept message for transmission. Note that the 10th to 15th identification information may be transmitted in these pieces of NSSAI, or may be transmitted as information different from these pieces of NSSAI.

By transmitting at least one of these pieces of identification information, the SMF and/or the AMF can notify the UE of details of these pieces of identification information.

Note that the SMF and/or the AMF may determine which piece of identification information is to be included in the PDU session establishment accept message, and/or the N1 SM container, and/or the NAS message, and/or the N2 SM information, and/or the N2 PDU session request message, based on each piece of received identification information, and/or the subscriber information, and/or the capability information of the network, and/or the UE policy, and/or the operator policy, and/or the state of the network, and/or the registration information of the user, and/or the context stored by the SMF and/or the AMF, and/or the like.

Next, in a case that the UE receives the NAS message via the N1 interface, for example (S816), the UE can recognize that the request of the UE by the PDU session establishment request message has been accepted, and/or details of the information and the like (a message, a container, information) included in the NAS message.

Based on reception of the 10th identification information, or the PDU session establishment accept message, or the N1 SM container, or the NAS message including the 10th identification information, the UE may recognize the first frequency band supported by the first base station apparatus and not supported by the second base station apparatus.

Based on reception of the 11th identification information, or the PDU session establishment accept message, or the N1 SM container, or the NAS message including the 11th identification information, the UE may recognize the first S-NSSAI corresponding to the first frequency band.

Based on reception of the 12th identification information, or the PDU session establishment accept message, or the N1 SM container, or the NAS message including the 12th identification information, the UE may recognize the second frequency band not supported by the first base station apparatus and supported by the second base station apparatus.

Based on reception of the 13th identification information, or the PDU session establishment accept message, or the N1 SM container, or the NAS message including the 13th identification information, the UE may recognize the second S-NSSAI corresponding to the second frequency band.

Based on reception of the 10th identification information, and/or the 11th identification information, and/or the PDU session establishment accept message, or the N1 SM container, or the NAS message including the 10th and/or 11 th identification information, the UE may determine that the UE can transmit a control message (for example, a registration request message, and/or a PDU session establishment request message, and/or an N1 SM container, and/or an NAS message) including the 1st identification information to the first base station apparatus.

In a case that the UE reselects the cell of the second base station apparatus and reselects the cell of the first base station apparatus again within a prescribed period based on reception of the 10th identification information, and/or the 11th identification information, and/or the PDU session establishment accept message, or the N1 SM container, or the NAS message including 10th and/or 11th identification information, the UE may determine that the UE can transmit a control message (for example, a registration request message, and/or a PDU session establishment request message, and/or an N1 SM container, and/or an NAS message) including the 1st identification information to the first base station apparatus.

In a case that the UE reselects the cell of the second base station apparatus based on reception of the 10th identification information, and/or the 11th identification information, and/or the PDU session establishment accept message, or the N1 SM container, or the NAS message including the 10th and/or 11th identification information, the UE may determine that the UE cannot transmit a control message (for example, a registration request message, and/or a PDU session establishment request message, and/or an N1 SM container, and/or an NAS message) including the 1st identification information to the second base station apparatus.

Based on reception of the 12th identification information, and/or the 13th identification information, and/or the PDU session establishment accept message, or the N1 SM container, or the NAS message including the 12th and/or 13th identification information, the UE may determine that the UE cannot transmit a control message (for example, a registration request message, and/or a PDU session establishment request message, and/or an N1 SM container, and/or an NAS message) including the 2nd identification information to the first base station apparatus.

In a case that the UE reselects the cell of the second base station apparatus based on reception of the 12th identification information, and/or the 13th identification information, and/or the PDU session establishment accept message, or the N1 SM container, or the NAS message including the 12th and/or 13th identification information, the UE may determine that the UE can transmit a control message (for example, a registration request message, and/or a PDU session establishment request message, and/or an N1 SM container, and/or an NAS message) including the 2nd identification information to the second base station apparatus.

In a case that the UE transmits the PDU session establishment request message, or the N1 SM container, or the NAS message including the 2nd identification information, based on reception of at least one piece of identification information out of the 12th to 13th and 15th identification information, or the PDU session establishment accept message, or the N1 SM container, or the NAS message including at least one piece of identification information out of the 12th to 13th and 15th identification information, the UE may recognize that the 2nd identification information has been rejected.

In a case that the UE transmits the PDU session establishment request message, or the N1 SM container, or the NAS message including the 2nd identification information, based on reception of at least one piece of identification information out of the 12th to 13th and 15th identification information, or the PDU session establishment accept message, or the N1 SM container, or the NAS message including at least one piece of identification information out of the 12th to 13th and 15th identification information, the UE may determine that the UE cannot transmit a control message (for example, a registration request message, and/or a PDU session establishment request message, and/or an N1 SM container, and/or an NAS message) including the 2nd identification information to the first base station apparatus.

In a case that the UE transmits the PDU session establishment request message, or the N1 SM container, or the NAS message including the 2nd identification information, based on reception of at least one piece of identification information out of the 12th to 13th and 15th identification information, or the PDU session establishment accept message, or the N1 SM container, or the NAS message including at least one piece of identification information out of the 12th to 13th and 15th identification information, the UE may perform cell reselection, and/or PLMN selection, and/or access network selection.

In a case that the UE transmits the PDU session establishment request message, or the N1 SM container, or the NAS message including the 2nd identification information, in a case that the UE reselects the cell of the second base station apparatus based on reception of at least one piece of identification information out of the 12th to 13th and 15th identification information, or the PDU session establishment accept message, or the N1 SM container, or the NAS message including at least one piece of identification information out of the 12th to 13th and 15th identification information, the UE may determine that the UE can transmit a control message (for example, a registration request message, and/or a PDU session establishment request message, and/or an N1 SM container, and/or an NAS message) including the 2nd identification information to the second base station apparatus.

Next, each step of the procedure of (B) of FIG. 7 will be described.

First, based on reception of the PDU session establishment request message, the SMF transmits the N1 SM container and/or the PDU session ID to the AMF via the N11 interface, for example (S818). Here, the N1 SM container may include a PDU session establishment reject message.

Next, the AMF that has received the N1 SM container and/or the PDU session ID transmits the NAS message to the UE via the first base station apparatus included in the access network (S820) (S822). Here, the NAS message is transmitted via the N1 interface, for example. The NAS message may be a downlink NAS transport (DL NAS TRANSPORT) message. The NAS message may include the PDU session ID and/or the N1 SM container.

The PDU session establishment reject message may be a response message to the PDU session establishment request. The PDU session establishment reject message may indicate that establishment of the PDU session has been rejected.

Here, by transmitting the PDU session establishment reject message, and/or the N1 SM container, and/or the PDU session ID, and/or the NAS message, the SMF and/or the AMF may indicate that the request of the UE by the PDU session establishment request message has been rejected.

Here, the SMF and/or the AMF may transmit at least one of the 10th to 15th identification information in the PDU session establishment reject message, and/or the N1 SM container, and/or the NAS message. Here, the 10th to 15th identification information may be as described in section 2.6.

Note that, by transmitting these pieces of identification information and/or the PDU session establishment reject message, the SMF may indicate that each function of the network is not supported, may indicate that the request of the UE has been rejected, may indicate that the request from the UE is not allowed, or may indicate information combining these. Furthermore, in a case that multiple pieces of identification information are transmitted and/or received, two or more pieces of identification information of these pieces of identification information may be configured as one or more pieces of identification information. Note that information indicating support of each function and information indicating a request for use of each function may be transmitted and/or received as the same piece of identification information, or may be transmitted and/or received as different pieces of identification information.

In a case that the SMF receives at least one piece out of the 1 st to 3rd identification information from the UE, the SMF may include at least one piece of identification information out of the 10th to 15th identification information in the PDU session establishment reject message for transmission.

Specifically, in a case that the SMF receives the PDU session establishment request message not including the 1st identification information and including the 2nd identification information from the UE via the first base station apparatus and the AMF, the SMF may transmit the PDU session establishment reject message including the 10th to 13th and 15th identification information.

Note that, in a case that the SMF receives the PDU session establishment request message from the UE via the first base station apparatus and the AMF, the SMF may transmit the PDU session establishment reject message including the 10th to 13th and 15th identification information, regardless of whether or not the PDU session establishment request message includes the 1st identification information and/or the 2nd identification information.

The SMF may include the configured NSSAI, and/or the allowed NSSAI, and/or the rejected NSSAI, and/or the pending NSSAI in the PDU session establishment accept message for transmission. Note that the 10th to 15th identification information may be transmitted in these pieces of NSSAI, or may be transmitted as information different from these pieces of NSSAI.

By transmitting at least one of these pieces of identification information, the SMF and/or the AMF can notify the UE of details of these pieces of identification information.

Note that the SMF and/or the AMF may determine which piece of identification information is to be included in the PDU session establishment reject message, and/or the N1 SM container, and/or the NAS message, and/or the N2 SM information, and/or the N2 PDU session request message, based on each piece of received identification information, and/or the subscriber information, and/or the capability information of the network, and/or the UE policy, and/or the operator policy, and/or the state of the network, and/or the registration information of the user, and/or the context stored by the SMF and/or the AMF, and/or the like.

Next, in a case that the UE receives the NAS message via the N1 interface, for example (S822), the UE can recognize that the request of the UE by the PDU session establishment request message has been rejected, and/or details of the information and the like (a message, a container, information) included in the NAS message.

Based on reception of the 10th identification information, or the PDU session establishment accept message, or the N1 SM container, or the NAS message including the 10th identification information, the UE may recognize the first frequency band supported by the first base station apparatus and not supported by the second base station apparatus.

Based on reception of the 11th identification information, or the PDU session establishment accept message, or the N1 SM container, or the NAS message including the 10th identification information, the UE may recognize the first S-NSSAI corresponding to the first frequency band.

Based on reception of the 12th identification information, or the PDU session establishment accept message, or the N1 SM container, or the NAS message including the 10th identification information, the UE may recognize the second frequency band not supported by the first base station apparatus and supported by the second base station apparatus.

Based on reception of the 13th identification information, or the PDU session establishment accept message, or the N1 SM container, or the NAS message including the 13th identification information, the UE may recognize the second S-NSSAI corresponding to the second frequency band.

Based on reception of the 10th identification information, and/or the 11th identification information, and/or the PDU session establishment reject message, or the N1 SM container, or the NAS message including the 10th and/or 11th identification information, the UE may determine that the UE can transmit a control message (for example, a registration request message, and/or a PDU session establishment request message, and/or an N1 SM container, and/or an NAS message) including the 1st identification information to the first base station apparatus.

In a case that the UE reselects the cell of the second base station apparatus and reselects the cell of the first base station apparatus again within a prescribed period based on reception of the 10th identification information, and/or the 11th identification information, and/or the PDU session establishment reject message, or the N1 SM container, or the NAS message including 10th and/or 11th identification information, the UE may determine that the UE can transmit a control message (for example, a registration request message, and/or a PDU session establishment request message, and/or an N1 SM container, and/or an NAS message) including the 1 st identification information to the first base station apparatus.

In a case that the UE reselects the cell of the second base station apparatus based on reception of the 10th identification information, and/or the 11th identification information, and/or the PDU session establishment reject message, or the N1 SM container, or the NAS message including the 10th and/or 11th identification information, the UE may determine that the UE cannot transmit a control message (for example, a registration request message, and/or a PDU session establishment request message, and/or an N1 SM container, and/or an NAS message) including the 1st identification information to the second base station apparatus.

Based on reception of the 12th identification information, and/or the 13th identification information, and/or the PDU session establishment reject message, or the N1 SM container, or the NAS message including the 12th and/or 13th identification information, the UE may determine that the UE cannot transmit a control message (for example, a registration request message, and/or a PDU session establishment request message, and/or an N1 SM container, and/or an NAS message) including the 2nd identification information to the first base station apparatus.

In a case that the UE reselects the cell of the second base station apparatus based on reception of the 12th identification information, and/or the 13th identification information, and/or the PDU session establishment reject message, or the N1 SM container, or the NAS message including the 12th and/or 13th identification information, the UE may determine that the UE can transmit a control message (for example, a registration request message, and/or a PDU session establishment request message, and/or an N1 SM container, and/or an NAS message) including the 2nd identification information to the second base station apparatus.

In a case that the UE transmits the PDU session establishment request message, or the N1 SM container, or the NAS message including the 2nd identification information, based on reception of at least one piece of identification information out of the 12th to 13th and 15th identification information, or the PDU session establishment reject message, or the N1 SM container, or the NAS message including at least one piece of identification information out of the 12th to 13th and 15th identification information, the UE may recognize that the 2nd identification information has been rejected.

In a case that the UE transmits the PDU session establishment request message, or the N1 SM container, or the NAS message including the 2nd identification information, based on reception of at least one piece of identification information out of the 12th to 13th and 15th identification information, or the PDU session establishment reject message, or the N1 SM container, or the NAS message including at least one piece of identification information out of the 12th to 13th and 15th identification information, the UE may determine that the UE cannot transmit a control message (for example, a registration request message, and/or a PDU session establishment request message, and/or an N1 SM container, and/or an NAS message) including the 2nd identification information to the first base station apparatus.

In a case that the UE transmits the PDU session establishment request message, or the N1 SM container, or the NAS message including the 2nd identification information, based on reception of at least one piece of identification information out of the 12th to 13th and 15th identification information, or the PDU session establishment reject message, or the N1 SM container, or the NAS message including at least one piece of identification information out of the 12th to 13th and 15th identification information, the UE may perform cell reselection, and/or PLMN selection, and/or access network selection.

In a case that the UE transmits the PDU session establishment request message, or the N1 SM container, or the NAS message including the 2nd identification information, in a case that the UE reselects the cell of the second base station apparatus based on reception of at least one piece of identification information out of the 12th to 13th and 15th identification information, or the PDU session establishment reject message, or the N1 SM container, or the NAS message including at least one piece of identification information out of the 12th to 13th and 15th identification information, the UE may determine that the UE can transmit a control message (for example, a registration request message, and/or a PDU session establishment request message, and/or an N1

SM container, and/or an NAS message) including the 2nd identification information to the second base station apparatus.

Note that the UE may additionally acquire the 10th to 13th identification information in the present procedure after the UE acquires the 10th to 13th identification information by performing the procedures from section 3.2 to section 3.7 one or more times. In this case, the UE may update information related to the 10th to 13th identification information to the details acquired in the present procedure.

Each apparatus may complete the present procedure, based on transmission and/or reception of a PDU session establishment accept message. In this case, each apparatus may transition to a state capable of communicating with the DN by using the established PDU session.

Each apparatus may complete the present procedure, based on transmission and/or reception of the PDU session establishment accept message or the PDU session establishment reject message. In this case, each apparatus cannot establish a PDU session, and thus in a case that no PDU session has been established yet, each apparatus cannot communicate with the DN.

Note that each type of processing performed by the UE based on reception of each piece of identification information described above may be performed during the present procedure or after completion of the present procedure or may be performed based on completion of the present procedure after completion of the present procedure.

3.7. PDU Session Establishment Procedure Via Second Base Station Apparatus

Next, a behavior of each apparatus of a case that the UE that has acquired at least one of the 10th to 13th identification information by performing the procedure of section 3.2 and/or section 3.3 and/or section 3.4 and/or section 3.5 performs the PDU session establishment procedure via the second base station apparatus in a case of reselecting the cell of the second base station apparatus will be described with reference to FIG. 7. A behavior of each apparatus of a case that the UE that has not acquired the 10th to 13th identification information although the UE has performed the procedure of section 3.2 and/or section 3.3 and/or section 3.4 and/or section 3.5 or because the UE does not perform the procedure of section 3.2 and/or section 3.3 and/or section 3.4 and/or section 3.5 performs the PDU session establishment procedure via the second base station apparatus in a case of reselecting the cell of the second base station apparatus will be described as well. In the present section, the PDU session establishment procedure via the second base station apparatus may be simply referred to as the present procedure or the PDU session establishment procedure.

Note that the present procedure may be performed after the procedures from section 3.4 to section 3.7 are performed one or more times.

As described above, the following description is given assuming a state in which the UE selects the cell of the second base station apparatus.

First, by transmitting the NAS message including an N1 SM container including the PDU session establishment request message to the AMF via the access network (S800), the UE initiates the PDU session establishment procedure.

Here, the access network is the 3GPP access or the non-3GPP access, and may include the second base station apparatus. In other words, the UE transmits the NAS message to the AMF via the second base station apparatus.

The UE can notify the network side of what is requested by the UE by including at least one piece out of the 1st to 3rd identification information in the PDU session establishment request message, and/or the N1 SM container, and/or the NAS message for transmission. Here, the 1st to 3rd identification information may be as described in section 2.6.

Note that the UE may determine whether to transmit which of 1st to 3rd identification information to the network based on the UE capability information, and/or the UE policy, and/or the UE state, and/or the user registration information, and/or a context stored in the UE, and/or the like.

In particular, in a case that the UE has not acquired the 10th to 13th identification information, the UE may determine whether to transmit the 1st to 3rd identification information to the network, based on the above.

For example, in a case that the UE has not acquired the 10th to 13th identification information, in the present procedure, the UE may transmit the 1st to 3rd identification information via the second base station apparatus.

In other words, in a case that the UE does not determine that the UE cannot transmit a control message including the 1st identification information to the second base station apparatus, or the UE does not determine that the UE can transmit a control message including the 2nd identification information to the second base station apparatus in the procedure of section 3.2 and/or section 3.3 and/or section 3.4 and/or section 3.5, in the present procedure, the UE may transmit the PDU session establishment request message, and/or the N1 SM container, and/or the NAS message including the 1st identification information and/or the 2nd identification information and/or the 3rd identification information via the first base station apparatus.

In a case that the UE has already acquired at least one of the 10th to 13th identification information, the UE may determine whether to transmit the 1st to 3rd identification information to the network, in consideration of not only the above but also the acquired identification information.

For example, in a case that the UE has already acquired at least one of the 10th to 13th identification information, the UE may transmit the 2nd identification information and the 3rd identification information and may not transmit the 1st identification information via the second base station apparatus, based on the acquired identification information.

In other words, in a case that the UE determines that the UE can transmit a control message including the 2nd identification information to the second base station apparatus in the procedure of section 3.2 and/or section 3.3 and/or section 3.4 and/or section 3.5, in the present procedure, the UE may transmit the PDU session establishment request message, and/or the N1 SM container, and/or the NAS message including the 2nd identification information and the 3rd identification information via the second base station apparatus.

In a case that the UE determines that the UE cannot transmit a control message including the 1st identification information to the second base station apparatus in the procedure of section 3.2 and/or section 3.3 and/or section 3.4 and/or section 3.5, in the present procedure, the UE need not transmit the PDU session establishment request message, and/or the N1 SM container, and/or the NAS message including the 1st identification information via the second base station apparatus.

Note that the UE may transmit these pieces of identification information in a control message different from these, for example, a control message of a layer (for example, an RRC layer, a MAC layer, an RLC layer, a PDCP layer, an SDAP layer, or the like) lower than the NAS layer, or a control message of a layer (for example, a transport layer, a session layer, a presentation layer, an application layer, or the like) higher than the NAS layer.

Next, in a case that the AMF receives the NAS message, the AMF can recognize what is requested by the UE, and/or details of information and the like (a message, a container, information) included in the NAS message.

Next, the AMF selects the SMF as a transfer destination of at least a part of the information and the like (a message, a container, information) included in the NAS message received from the UE (S802). Note that the AMF may select the SMF being a transfer destination, based on the information and the like (a message, a container, information) included in the NAS message, and/or the subscriber information, and/or the capability information of the network, and/or the UE policy, and/or the operator policy, and/or the state of the network, and/or the registration information of the user, and/or the context stored by the AMF, and/or the like.

Next, the AMF transmits at least a part of the information and the like (a message, a container, information) included in the NAS message received from the UE to the selected SMF via the N11 interface, for example (S804).

Next, in a case that the SMF receives information and the like (a message, a container, information) transmitted from the AMF, the SMF can recognize what is requested by the UE, and/or details of the information and the like (a message, a container, information) received from the AMF.

Here, the SMF may perform the second condition fulfillment determination. The second condition fulfillment determination may be for determining whether or not the network accepts the request of the UE. In a case that the SMF determines that the second condition fulfillment determination is true, the SMF may initiate the procedure of (A) of FIG. 7, whereas in a case that the SMF determines that the second condition fulfillment determination is false, the SMF may initiate the procedure of (B) of FIG. 7.

Note that the second condition fulfillment determination may be performed by an NF other than the SMF. The NF may be, for example, an NSSF, an NWDAF, a PCF, or an NRF. In a case that the NF other than the SMF performs the second condition fulfillment determination, the SMF may provide the NF with at least a part of information necessary for performing the second condition fulfillment determination, specifically, information received from the UE (S806). Then, in a case that the NF determines true or false of the second condition fulfillment determination based on the information received from the SMF, the NF may notify the SMF of information including results (in other words, true or false) of the second condition fulfillment determination. The SMF may determine the identification information and/or the control message to be transmitted to the UE, based on the results of the second condition fulfillment determination received from the NF.

Note that the second condition fulfillment determination may be performed based on the information and the like (a message, a container, information) received from the AMF, and/or the subscriber information, and/or the capability information of the network, and/or the UE policy, and/or the operator policy, and/or the state of the network, and/or the registration information of the user, and/or the context stored by the SMF, and/or the like.

For example, in a case that the network allows the request of the UE, the second condition fulfillment determination may be determined as true, whereas in a case that the network does not allow the request of the UE, the second condition fulfillment determination may be determined as false. In a case that a network as a connection destination of the UE and/or an apparatus in the network supports the function requested by the UE, the second condition fulfillment determination may be determined as true, whereas in a case that the network and/or the apparatus does not support the function requested by the UE, the second condition fulfillment determination may be determined as false. In a case that the transmitted and/or received identification information is allowed, the second condition fulfillment determination may be determined as true, whereas in a case that the transmitted and/or received identification information is not allowed, the second condition fulfillment determination may be determined as false.

In a case that the SMF receives a control message (the PDU session establishment request message and/or the N1 SM container and/or the NAS message) including neither the 1st identification information nor the 2nd identification information from the UE, true or false of the first condition fulfillment determination may be determined based on the above. In a case that the SMF receives a control message (the PDU session establishment request message and/or the N1 SM container and/or the NAS message) including the 1st identification information and the 2nd identification information from the UE, the second condition fulfillment determination may be determined as true. In a case that the SMF receives a control message (the PDU session establishment request message and/or the N1 SM container and/or the NAS message) including the 1st identification information and not including the 2nd identification information from the UE, the second condition fulfillment determination may be determined as false. In a case that the SMF receives a control message (the PDU session establishment request message and/or the N1 SM container and/or the NAS message) not including the 1st identification information and including the 2nd identification information from the UE, the second condition fulfillment determination may be determined as true.

Note that the condition for determining true or false of the second condition fulfillment determination need not necessarily be limited to the condition described above.

Next, each step of the procedure of (A) of FIG. 7 will be described.

Next, the SMF may select the UPF for a PDU session to be established, and transmit an N4 session establishment request message to the selected UPF via the N4 interface, for example (S808). The N4 session establishment request message may include at least a part of a PCC rule received from the PCF.

Here, the SMF may select one or more UPFs, based on the information and the like (a message, a container, information) received from the AMF, and/or the information such as the PCC rule received from the PCF, and/or the subscriber information, and/or the capability information of the network, and/or the UE policy, and/or the operator policy, and/or the state of the network, and/or the registration information of the user, and/or the context stored by the SMF, and/or the like. In a case that multiple UPFs are selected, the SMF may transmit the N4 session establishment request message to each UPF. The description below assumes that UPF_230 is selected.

Next, in a case that the UPF receives the N4 session establishment request message (S808), the UPF can recognize details of the information received from the SMF. The UPF may transmit an N4 session establishment response message to the SMF via the N4 interface, for example, based on reception of the N4 session establishment request message (S810).

Next, in a case that the SMF receives the N4 session establishment response message as a response message to the N4 session establishment request message, the SMF can recognize details of the information received from the UPF.

Next, the SMF transmits the N1 SM container, and/or N2 SM information, and/or the PDU session ID to the AMF via the N11 interface, for example, based on reception of the PDU session establishment request message, and/or selection of the UPF, and/or reception of the N4 session establishment response message, and/or the like (S812). Here, the N1 SM container may include the PDU session establishment accept message.

Next, the AMF that has received the N1 SM container, and/or the N2 SM information, and/or the PDU session ID transmits the NAS message to the UE via the second base station apparatus included in the access network (S814) (S816). Here, the NAS message is transmitted via the N1 interface, for example. The NAS message may be a downlink NAS transport (DL NAS TRANSPORT) message.

Specifically, in a case that the AMF transmits an N2 PDU session request message to the second base station apparatus included in the access network (S814), the second base station apparatus that has received the N2 PDU session request message transmits the NAS message to the UE (S816). Here, the N2 PDU session request message may include the NAS message and/or the N2 SM information. The NAS message may include the PDU session ID and/or the N1 SM container.

The PDU session establishment accept message may be a response message to the PDU session establishment request. The PDU session establishment accept message may indicate that establishment of the PDU session has been accepted.

Here, by transmitting the PDU session establishment accept message, and/or the N1 SM container, and/or the PDU session ID, and/or the NAS message, and/or the N2 SM information, and/or the N2 PDU session request message, the SMF and/or the AMF may indicate that at least a part of the request of the UE by the PDU session establishment request message has been accepted.

Here, the SMF and/or the AMF may include at least one piece out of the 10th to 14th and 16th identification information in the PDU session establishment accept message, and/or the N1 SM container, and/or the NAS message, and/or the N2 SM information, and/or the N2 PDU session request message for transmission. Here, the 10th to 14th and 16th identification information may be as described in section 2.6.

Note that, by transmitting these pieces of identification information and/or the PDU session establishment accept message, the SMF may indicate that the network supports each function, may indicate that the request of the UE has been accepted, may indicate that the request from the UE is not allowed, or may indicate information of a combination of these. Furthermore, in a case that multiple pieces of identification information are transmitted and/or received, two or more pieces of identification information of these pieces of identification information may be configured as one or more pieces of identification information. Note that information indicating support of each function and information indicating a request for use of each function may be transmitted and/or received as the same piece of identification information, or may be transmitted and/or received as different pieces of identification information.

In a case that the SMF receives at least one piece out of the 1 st to 3rd identification information from the UE, the SMF may include at least one piece of identification information out of the 10th to 14th and 16th identification information in the PDU session establishment accept message for transmission.

Specifically, in a case that the SMF receives the PDU session establishment request message including the 2nd identification information and not including the 1st identification information from the UE via the second base station apparatus and the AMF, the SMF may transmit the PDU session establishment accept message including the 10th to 14th and 16th identification information.

In a case that the SMF receives the PDU session establishment request message including the 1st identification information and the 2nd identification information from the UE via the second base station apparatus and the AMF, the SMF may transmit the PDU session establishment accept message including the 10th to 14th and 16th identification information.

Note that, in a case that the SMF receives the PDU session establishment request message from the UE via the second base station apparatus and the AMF, the SMF may transmit the PDU session establishment accept message including the 10th to 13th and 15th identification information, regardless of whether or not the PDU session establishment request message includes the 1st identification information and/or the 2nd identification information.

The SMF may include the configured NSSAI, and/or the allowed NSSAI, and/or the rejected NSSAI, and/or the pending NSSAI in the PDU session establishment accept message for transmission. Note that the 10th to 14th and 16th identification information may be transmitted in these pieces of NSSAI, or may be transmitted as information different from these pieces of NSSAI.

By transmitting at least one of these pieces of identification information, the SMF and/or the AMF can notify the UE of details of these pieces of identification information.

Note that the SMF and/or the AMF may determine which piece of identification information is to be included in the PDU session establishment accept message, and/or the N1 SM container, and/or the NAS message, and/or the N2 SM information, and/or the N2 PDU session request message, based on each piece of received identification information, and/or the subscriber information, and/or the capability information of the network, and/or the UE policy, and/or the operator policy, and/or the state of the network, and/or the registration information of the user, and/or the context stored by the SMF and/or the AMF, and/or the like.

Next, in a case that the UE receives the NAS message via the N1 interface, for example (S816), the UE can recognize that the request of the UE by the PDU session establishment request message has been accepted, and/or details of the information and the like (a message, a container, information) included in the NAS message.

Based on reception of the 10th identification information, or the PDU session establishment accept message, or the N1 SM container, or the NAS message including the 10th identification information, the UE may recognize the first frequency band supported by the first base station apparatus and not supported by the second base station apparatus.

Based on reception of the 11th identification information, or the PDU session establishment accept message, or the N1 SM container, or the NAS message including the 11th identification information, the UE may recognize the first S-NSSAI corresponding to the first frequency band.

Based on reception of the 12th identification information, or the PDU session establishment accept message, or the N1 SM container, or the NAS message including the 12th identification information, the UE may recognize the second frequency band not supported by the first base station apparatus and supported by the second base station apparatus.

Based on reception of the 13th identification information, or the PDU session establishment accept message, or the N1 SM container, or the NAS message including the 13th identification information, the UE may recognize the second S-NSSAI corresponding to the second frequency band.

In a case that the UE reselects the cell of the first base station apparatus based on reception of the 10th identification information, and/or the 11th identification information, and/or the PDU session establishment accept message, or the N1 SM container, or the NAS message including the 10th and/or 11th identification information, the UE may determine that the UE can transmit a control message (for example, a registration request message, and/or a PDU session establishment request message, and/or an N1 SM container, and/or an NAS message) including the 1st identification information to the first base station apparatus.

Based on reception of the 10th identification information, and/or the 11th identification information, and/or the PDU session establishment accept message, or the N1 SM container, or the NAS message including the 10th and/or 11th identification information, the UE may determine that the UE cannot transmit a control message (for example, a registration request message, and/or a PDU session establishment request message, and/or an N1 SM container, and/or an NAS message) including the 1st identification information to the second base station apparatus.

In a case that the UE reselects the cell of the first base station apparatus based on reception of the 12th identification information, and/or the 13th identification information, and/or the PDU session establishment accept message, or the N1 SM container, or the NAS message including the 12th and/or 13th identification information, the UE may determine that the UE cannot transmit a control message (for example, a registration request message, and/or a PDU session establishment request message, and/or an N1 SM container, and/or an NAS message) including the 2nd identification information to the first base station apparatus.

Based on reception of the 12th identification information, and/or the 13th identification information, and/or the PDU session establishment accept message, or the N1 SM container, or the NAS message including the 12th and/or 13th identification information, the UE may determine that the UE can transmit a control message (for example, a registration request message, and/or a PDU session establishment request message, and/or an N1 SM container, and/or an NAS message) including the 2nd identification information to the second base station apparatus.

In a case that the UE reselects the cell of the first base station apparatus and reselects the cell of the second base station apparatus again within a prescribed period based on reception of the 12th identification information, and/or the 13th identification information, and/or the PDU session establishment accept message, or the N1 SM container, or the NAS message including the 12th and/or 13th identification information, the UE may determine that the UE can transmit a control message (for example, a registration request message, and/or a PDU session establishment request message, and/or an N1 SM container, and/or an NAS message) including the 2nd identification information to the second base station apparatus.

In a case that the UE transmits the PDU session establishment request message, or the N1 SM container, or the NAS message including the 1st identification information, based on reception of at least one piece of identification information out of the 10th to 11th and 16th identification information, or the PDU session establishment accept message, or the N1 SM container, or the NAS message including at least one piece of identification information out of the 10th to 11th and 16th identification information, the UE may recognize that the 1 st identification information has been rejected.

In a case that the UE transmits the PDU session establishment request message, or the N1 SM container, or the NAS message including the 1st identification information, based on reception of at least one piece of identification information out of the 10th to 11th and 16th identification information, or the PDU session establishment accept message, or the N1 SM container, or the NAS message including at least one piece of identification information out of the 10th to 11th and 16th identification information, the UE may determine that the UE cannot transmit a control message (for example, a registration request message, and/or a PDU session establishment request message, and/or an N1 SM container, and/or an NAS message) including the 1st identification information to the second base station apparatus.

In a case that the UE transmits the PDU session establishment request message, or the N1 SM container, or the NAS message including the 1st identification information, based on reception of at least one piece of identification information out of the 10th to 11th and 16th identification information, or the PDU session establishment accept message, or the N1 SM container, or the NAS message including at least one piece of identification information out of the 10th to 11th and 16th identification information, the UE may perform cell reselection, and/or PLMN selection, and/or access network selection.

In a case that the UE transmits the PDU session establishment request message, or the N1 SM container, or the NAS message including the 1st identification information, in a case that the UE reselects the cell of the first base station apparatus based on reception of at least one piece of identification information out of the 10th to 11th and 16th identification information, or the PDU session establishment accept message, or the N1 SM container, or the NAS message including at least one piece of identification information out of the 10th to 11th and 16th identification information, the UE may determine that the UE can transmit a control message (for example, a registration request message, and/or a PDU session establishment request message, and/or an N1 SM container, and/or an NAS message) including the 1st identification information to the first base station apparatus.

Next, each step of the procedure of (B) of FIG. 7 will be described.

First, based on reception of the PDU session establishment request message, the SMF transmits the N1 SM container and/or the PDU session ID to the AMF via the N11 interface, for example (S818). Here, the N1 SM container may include a PDU session establishment reject message.

Next, the AMF that has received the N1 SM container and/or the PDU session ID transmits the NAS message to the UE via the first base station apparatus included in the access network (S820) (S822). Here, the NAS message is transmitted via the N1 interface, for example. The NAS message may be a downlink NAS transport (DL NAS TRANSPORT) message. The NAS message may include the PDU session ID and/or the N1 SM container.

The PDU session establishment reject message may be a response message to the PDU session establishment request. The PDU session establishment reject message may indicate that establishment of the PDU session has been rejected.

Here, by transmitting the PDU session establishment reject message, and/or the N1 SM container, and/or the PDU session ID, and/or the NAS message, the SMF and/or the AMF may indicate that the request of the UE by the PDU session establishment request message has been rejected.

Here, the SMF and/or the AMF may transmit at least one of the 10th to 14th and 16th identification information in the PDU session establishment reject message, and/or the N1 SM container, and/or the NAS message. Here, the 10th to 14th and 16th identification information may be as described in section 2.6.

Note that, by transmitting these pieces of identification information and/or the PDU session establishment reject message, the SMF may indicate that each function of the network is not supported, may indicate that the request of the UE has been rejected, may indicate that the request from the UE is not allowed, or may indicate information combining these. Furthermore, in a case that multiple pieces of identification information are transmitted and/or received, two or more pieces of identification information of these pieces of identification information may be configured as one or more pieces of identification information. Note that information indicating support of each function and information indicating a request for use of each function may be transmitted and/or received as the same piece of identification information, or may be transmitted and/or received as different pieces of identification information.

In a case that the SMF receives at least one piece out of the 1st to 3rd identification information from the UE, the SMF may include at least one piece of identification information out of the 10th to 14th and 16th identification information in the PDU session establishment reject message for transmission.

Specifically, in a case that the SMF receives the PDU session establishment request message not including the 2nd identification information and including the 1st identification information from the UE via the second base station apparatus and the AMF, the SMF may transmit the PDU session establishment reject message including the 10th to 14th and 16th identification information.

Note that, in a case that the SMF receives the PDU session establishment request message from the UE via the second base station apparatus and the AMF, the SMF may transmit the PDU session establishment reject message including the 10th to 14th and 16th identification information, regardless of whether or not the PDU session establishment request message includes the 1st identification information and/or the 2nd identification information.

The SMF may include the configured NSSAI, and/or the allowed NSSAI, and/or the rejected NSSAI, and/or the pending NSSAI in the PDU session establishment accept message for transmission. Note that the 10th to 15th identification information may be transmitted in these pieces of NSSAI, or may be transmitted as information different from these pieces of NSSAI.

By transmitting at least one of these pieces of identification information, the SMF and/or the AMF can notify the UE of details of these pieces of identification information.

Note that the SMF and/or the AMF may determine which piece of identification information is to be included in the PDU session establishment reject message, and/or the N1 SM container, and/or the NAS message, and/or the N2 SM information, and/or the N2 PDU session request message, based on each piece of received identification information, and/or the subscriber information, and/or the capability information of the network, and/or the UE policy, and/or the operator policy, and/or the state of the network, and/or the registration information of the user, and/or the context stored by the SMF and/or the AMF, and/or the like.

Next, in a case that the UE receives the NAS message via the N1 interface, for example (S822), the UE can recognize that the request of the UE by the PDU session establishment request message has been rejected, and/or details of the information and the like (a message, a container, information) included in the NAS message.

Based on reception of the 10th identification information, or the PDU session establishment accept message, or the N1 SM container, or the NAS message including the 10th identification information, the UE may recognize the first frequency band supported by the first base station apparatus and not supported by the second base station apparatus.

Based on reception of the 11th identification information, or the PDU session establishment accept message, or the N1 SM container, or the NAS message including the 11th identification information, the UE may recognize the first S-NSSAI corresponding to the first frequency band.

Based on reception of the 12th identification information, or the PDU session establishment accept message, or the N1 SM container, or the NAS message including the 12th identification information, the UE may recognize the second frequency band not supported by the first base station apparatus and supported by the second base station apparatus.

Based on reception of the 13th identification information, or the PDU session establishment accept message, or the N1 SM container, or the NAS message including the 13th identification information, the UE may recognize the second S-NSSAI corresponding to the second frequency band.

In a case that the UE reselects the cell of the first base station apparatus based on reception of the 10th identification information, and/or the 11th identification information, and/or the PDU session establishment reject message, or the N1 SM container, or the NAS message including the 10th and/or 11th identification information, the UE may determine that the UE can transmit a control message (for example, a registration request message, and/or a PDU session establishment request message, and/or an N1 SM container, and/or an NAS message) including the 1st identification information to the first base station apparatus.

Based on reception of the 10th identification information, and/or the 1th identification information, and/or the PDU session establishment reject message, or the N1 SM container, or the NAS message including the 10th and/or 11th identification information, the UE may determine that the UE cannot transmit a control message (for example, a registration request message, and/or a PDU session establishment request message, and/or an N1 SM container, and/or an NAS message) including the 1st identification information to the second base station apparatus.

In a case that the UE reselects the cell of the first base station apparatus based on reception of the 12th identification information, and/or the 13th identification information, and/or the PDU session establishment reject message, or the N1 SM container, or the NAS message including the 12th and/or 13th identification information, the UE may determine that the UE cannot transmit a control message (for example, a registration request message, and/or a PDU session establishment request message, and/or an N1 SM container, and/or an NAS message) including the 2nd identification information to the first base station apparatus.

Based on reception of the 12th identification information, and/or the 13th identification information, and/or the PDU session establishment reject message, or the N1 SM container, or the NAS message including the 12th and/or 13th identification information, the UE may determine that the UE can transmit a control message (for example, a registration request message, and/or a PDU session establishment request message, and/or an N1 SM container, and/or an NAS message) including the 2nd identification information to the second base station apparatus.

In a case that the UE reselects the cell of the first base station apparatus and reselects the cell of the second base station apparatus again within a prescribed period based on reception of the 12th identification information, and/or the 13th identification information, and/or the PDU session establishment reject message, or the N1 SM container, or the NAS message including the 12th and/or 13th identification information, the UE may determine that the UE can transmit a control message (for example, a registration request message, and/or a PDU session establishment request message, and/or an N1 SM container, and/or an NAS message) including the 2nd identification information to the second base station apparatus.

In a case that the UE transmits the PDU session establishment request message, or the N1 SM container, or the NAS message including the 1st identification information, based on reception of at least one piece of identification information out of the 10th to 11th and 16th identification information, or the PDU session establishment reject message, or the N1 SM container, or the NAS message including at least one piece of identification information out of the 10th to 11th and 16th identification information, the UE may recognize that the 1st identification information has been rejected.

In a case that the UE transmits the PDU session establishment request message, or the N1 SM container, or the NAS message including the 1 st identification information, based on reception of at least one piece of identification information out of the 10th to 11th and 16th identification information, or the PDU session establishment reject message, or the N1 SM container, or the NAS message including at least one piece of identification information out of the 10th to 11th and 16th identification information, the UE may determine that the UE cannot transmit a control message (for example, a registration request message, and/or a PDU session establishment request message, and/or an N1 SM container, and/or an NAS message) including the 1st identification information to the second base station apparatus.

In a case that the UE transmits the PDU session establishment request message, or the N1 SM container, or the NAS message including the 1st identification information, based on reception of at least one piece of identification information out of the 10th to 11th and 16th identification information, or the PDU session establishment reject message, or the N1 SM container, or the NAS message including at least one piece of identification information out of the 10th to 11th and 16th identification information, the UE may perform cell reselection, and/or PLMN selection, and/or access network selection.

In a case that the UE transmits the PDU session establishment request message, or the N1 SM container, or the NAS message including the 1st identification information, in a case that the UE reselects the cell of the first base station apparatus based on reception of at least one piece of identification information out of the 10th to 11th and 16th identification information, or the PDU session establishment reject message, or the N1 SM container, or the NAS message including at least one piece of identification information out of the 10th to 11th and 16th identification information, the UE may determine that the UE can transmit a control message (for example, a registration request message, and/or a PDU session establishment request message, and/or an N1 SM container, and/or an NAS message) including the 1st identification information to the first base station apparatus.

Note that the UE may additionally acquire the 10th to 13th identification information in the present procedure after the UE acquires the 10th to 13th identification information by performing the procedures from section 3.2 to section 3.7 one or more times. In this case, the UE may update information related to the 10th to 13th identification information to the details acquired in the present procedure.

Each apparatus may complete the present procedure, based on transmission and/or reception of a PDU session establishment accept message. In this case, each apparatus may transition to a state capable of communicating with the DN by using the established PDU session.

Each apparatus may complete the present procedure, based on transmission and/or reception of the PDU session establishment accept message or the PDU session establishment reject message. In this case, each apparatus cannot establish a PDU session, and thus in a case that no PDU session has been established yet, each apparatus cannot communicate with the DN.

Note that each type of processing performed by the UE based on reception of each piece of identification information described above may be performed during the present procedure or after completion of the present procedure or may be performed based on completion of the present procedure after completion of the present procedure.

4. Modified Examples

A program running on an apparatus according to the present invention may serve as a program that controls a Central Processing Unit (CPU) and the like to cause a computer to operate in such a manner as to realize the functions of the aforementioned embodiment according to the present invention. Programs or information handled by the programs are temporarily stored in a volatile memory such as a Random Access Memory (RAM), a non-volatile memory such as a flash memory, a Hard Disk Drive (HDD), or another storage device system.

Note that a program for realizing the functions of the embodiments according to the present invention may be recorded on a computer-readable recording medium. The functions may be realized by causing a computer system to read the program recorded on the recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, a medium dynamically retaining the program for a short time, or any other computer readable recording medium.

Furthermore, each functional block or various features of the apparatuses used in the aforementioned embodiment may be implemented or performed on an electric circuit, for example, an integrated circuit or multiple integrated circuits. An electric circuit designed to perform the functions described in the present specification may include a general purpose processor, a digital signal processor (DSP), an application specific integrated circuit (ASIC), a field programmable gate array (FPGA), or other programmable logic devices, discrete gates or transistor logic, discrete hardware components, or a combination thereof. The general-purpose processor may be a microprocessor, or may be a processor of a known type, a controller, a micro-controller, or a state machine instead. The aforementioned electric circuit may include a digital circuit or may include an analog circuit. In a case that with advances in semiconductor technology, a circuit integration technology appears that replaces the present integrated circuits, it is possible for one or multiple aspects of the present invention to use a new integrated circuit based on the technology.

Note that the invention of the present application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

Although, the embodiments of the present invention have been described in detail above referring to the drawings, the specific configuration is not limited to the embodiments and includes, for example, design changes within the scope that does not depart from the gist of the present invention. Furthermore, in the present invention, various modifications are possible within the scope of claims, and embodiments that are made by suitably combining technical means disclosed according to the different embodiments are also included in the technical scope of the present invention. Furthermore, a configuration in which elements described in the respective embodiments and having mutually the same effects, are substituted for one another is also included.

REFERENCE SIGNS LIST

1 Mobile communication system
10 UE_A
30 PGW-U
32 PGW-C
35 SGW
40 MME
45 eNB
50 HSS
60 PCRF
80 Access network_A (E-UTRAN)
90 Core network_A
120 Access network_B (5G AN)
122 gNB 130 UPF
132 SMF
140 AMF
150 UDM
160 PCF
190 Core network_B

The invention claimed is:

1. A core network apparatus comprising:
transmission and reception circuitry,
wherein
in a case that a requested Network Slice Selection Assistance Information (NSSAI) received from a User Equipment (UE) contains at least one Single NSSAI (S-NSSAI) that is not available in a current tracking area, in a registration procedure over 3GPP access,
the transmission and reception circuitry is configured to:
transmit (i) an NSSAI including an S-NSSAI from the requested NSSAI not available in the current tracking area but available in another tracking area in a different frequency band and (ii) first information on the different frequency band associated with the S-NSSAI;
redirect the UE to a cell in the different frequency band based on the first information; and
in a case that the first information is updated, the transmission and reception circuitry is further configured to transmit second information on another frequency band associated with the S-NSSAI.

2. A communication control method performed by a core network apparatus, the communication control method comprising:
in a case that a requested Network Slice Selection Assistance Information (NSSAI) received from a User Equipment (UE) contains at least one Single NSSAI (S-NSSAI) that is not available in a current tracking area, in a registration procedure over 3GPP access,
transmitting (i) an NSSAI including an S-NSSAI from the requested NSSAI not available in the current tracking area but available in another tracking area in a different frequency band and (ii) first information on the different frequency band associated with the S-NSSAI;
redirecting the UE to a cell in the different frequency band based on the first information; and
in a case that the first information is updated, transmitting second information on another frequency band associated with the S-NSSAI.

* * * * *